United States Patent
Patel et al.

(10) Patent No.: US 12,147,571 B2
(45) Date of Patent: *Nov. 19, 2024

(54) PRIVATE INFORMATION RETRIEVAL WITH SUBLINEAR PUBLIC-KEY OPERATIONS

(71) Applicant: Google LLC, Mountain View, CA (US)

(72) Inventors: Sarvar Patel, Montville, NJ (US); Kevin Yeo, Mountain View, CA (US); Giuseppe Persiano, New York, NY (US)

(73) Assignee: Google LLC, Mountain View, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/167,490

(22) Filed: Feb. 10, 2023

(65) Prior Publication Data

US 2023/0185960 A1    Jun. 15, 2023

Related U.S. Application Data

(63) Continuation of application No. 17/053,648, filed as application No. PCT/US2018/031369 on May 7, 2018, now Pat. No. 11,593,516.

(51) Int. Cl.
*G06F 21/62*    (2013.01)
*G06F 17/16*    (2006.01)
(Continued)

(52) U.S. Cl.
CPC .......... *G06F 21/6245* (2013.01); *G06F 17/16* (2013.01); *G06F 21/602* (2013.01); *H04L 9/008* (2013.01)

(58) Field of Classification Search
CPC .... G06F 21/6245; G06F 17/16; G06F 21/602; H04L 9/008; H04L 9/30
See application file for complete search history.

(56) References Cited

U.S. PATENT DOCUMENTS 5,890,151 A * 3/1999 Agrawal ........... G06F 16/24556
707/999.005
8,635,465 B1 * 1/2014 Juels .................... H04L 63/0428
713/193

(Continued)

OTHER PUBLICATIONS

Remote Oblivious Storage: Making Oblivious RAM Practical:, Dan Boneh, Mar. 30, 2011.

(Continued)

*Primary Examiner* — Meng Li
(74) *Attorney, Agent, or Firm* — Honigman LLP; Brett A. Krueger

(57) ABSTRACT

A method includes initializing a client state on a client device be executing a private batched sum retrieval instruction to compute c sums O of data blocks from an untrusted storage device. Each computed sum O stored on memory hardware of the client device and including a sum of a corresponding subset S of exactly k data blocks. The method also includes a query instruction to retrieve a query block $B_q$ stored on the untrusted storage device by iterating through each of the c sums O of data blocks to identify one of the c sums O that does not include the query block $B_q$, instructing a service to pseudorandomly partition the untrusted storage device into partitions and sum the data blocks in each partition to determine a corresponding encrypted data block sum.

20 Claims, 18 Drawing Sheets

(51) Int. Cl.
      *G06F 21/60*      (2013.01)
      *H04L 9/00*      (2022.01)

(56) References Cited

U.S. PATENT DOCUMENTS

| | | | | |
|---|---|---|---|---|
| 10,268,834 | B2 * | 4/2019 | Pourzandi | ............... H04L 9/008 |
| 2016/0344553 | A1 * | 11/2016 | Chen | ..................... G06F 16/278 |
| 2017/0031627 | A1 * | 2/2017 | Kazi | ..................... H04L 63/108 |
| 2017/0124348 | A1 | 5/2017 | Pourzandi et al. | |
| 2018/0011867 | A1 * | 1/2018 | Bowman | ............... H05K 999/99 |
| 2019/0129888 | A1 * | 5/2019 | Bowman | ............... G06F 3/0604 |

OTHER PUBLICATIONS

"Oblivious RAM"; Proceeding of the VLDB Endowment, Zhao Chang, Aug. 1, 2016.
"Multi-cloud oblivious storage", Emil Stefanov, Nov. 4, 2013 pp. 247-258.
International Search Report and Written Opinion for the related PCT Application PCT/US2018/031369 dated Nov. 27, 2018.
USPTO. Office Action relating to U.S. Appl. No. 17/053,648, dated Jul. 29, 2022.

\* cited by examiner $K \leftarrow$ PRPartition.GenerateKey$(n, k, S)$

1. Client locally sorts $S$.
2. Initialize prev $\leftarrow 0$.
3. For $i = 1, \ldots, k$:
   (a) Initialize $n_i \leftarrow S[i]$ − prev.
   (b) prev $\leftarrow n_i$.
4. Client locally constructs online partial sums data structure $D_{\text{Sum}} \leftarrow$ PartialSums.Init$(n_1, \ldots, n_k)$. As a result, we note that PartialSums.Sum$(D_{\text{Sum}}, i) = S[i]$ for all $i \in [k]$.
5. Generate uniformly at random $r \in [n/k]$ and a pseudorandom permutation $\tau : [k] \to [k]$. We will embed $S$ into the $r$-th row of the matrix in the order described by $\tau$.
6. Initialize idx $\leftarrow 1$.
7. While idx $\leq k$:
   (a) Initialize rank$_{\text{idx}} \leftarrow$ PartialSums.Sum$(\tau(\text{idx}))$.
   (b) Set unused := $n - (n/k)(\text{idx} - 1)$.
   (c) Generate a pseudorandom permutation $\gamma : [\text{unused}] \to [\text{unused}]$.
   (d) Initialize pivot $\leftarrow \gamma^{-1}(\text{rank}_{\text{idx}}) - r$.
   (e) For $i = \text{pivot}, \ldots, \text{pivot} + (n/k) - 1 \mod \text{unused}$:
      i. Execute $j \leftarrow$ PartialSums.Select$(D_{\text{Sum}}, \gamma(i))$.
      ii. If PartialSums.Sum$(D_{\text{Sum}}, j) = \gamma(i)$ and $\gamma(i) \neq \text{rank}_{\text{idx}}$ then:
         A. Go back to Step 7c.
   (f) For $i = \text{pivot}, \ldots, \text{pivot} + (n/k) - 1 \mod \text{unused}$:
      i. Execute $j \leftarrow$ PartialSums.Select$(D_{\text{Sum}}, \gamma(i))$.
      ii. Execute $D_{\text{Sum}} \leftarrow$ PartialSums.Update$(D_{\text{Sum}}, j, -1)$.
   (g) Initialize $\gamma_{\text{idx}} \leftarrow \gamma$.
   (h) Initialize pivot$_{\text{idx}} \leftarrow$ pivot.
   (i) Increment idx by 1.
8. Return $(\gamma_1, \ldots, \gamma_k, \text{pivot}_1, \ldots, \text{pivot}_k)$.

FIG. 4A

*PRPartition.GetPartition.* This algorithm takes as input a key $\mathcal{K}$ and produces the $n/k$ parts, which make up a partition of $[n]$.

$(P_1, \ldots, P_{n/k}) \leftarrow$ PRPartition.GetPartition$(\gamma_1, \ldots, \gamma_k, \text{pivot}_1, \ldots, \text{pivot}_q)$.

1. Construct a vector of $n$ integers, $v = (1, \ldots, 1)$.
2. Execute $D_{\text{Sum}} \leftarrow$ PartialSums.Init$(v)$.
3. For $i = 1, \ldots, n/k$:
    (a) For $j = 1, \ldots, k$:
        i. Initialize $\text{idx}_j \leftarrow$ PartialSums.Select$(\gamma_k(\text{pivot}_i + j))$.
    (b) Set $P_i \leftarrow \{\text{idx}_j\}_{j \in [k]}$.
    (c) For $j = 1, \ldots, k$:
        i. Execute $D_{\text{Sum}} \leftarrow$ PartialSums.Update$(D_{\text{Sum}}, \text{idx}_j, -1)$.
4. Return $(P_1, \ldots, P_{n/k})$.

FIG. 4B

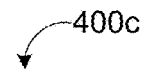

SublinearPIR.Init. This algorithm initializes a client state without any input.

$(\text{count}, \text{unused}, O_1, \ldots, O_c, \pi_1, \ldots, \pi_c) \leftarrow \text{SublinearPIR.Init}()$ 1. Initialize count $\leftarrow 1$, unused $\leftarrow 1$.
2. Randomly generate $c$ pseudorandom permutations $\pi_1, \ldots, \pi_c$.
3. Set $S_1 = \{\pi_1(1), \ldots, \pi_1(k)\}, \ldots, S_c = \{\pi_c(1), \ldots, \pi_c(k)\}$.
4. Execute $(O_1, \ldots, O_c) \leftarrow \text{BSR}(S_1, \ldots, S_c)$.
5. Return (count, unused, $O_1, \ldots, O_c, \pi_1, \ldots, \pi_c$).

FIG. 4C

SublinearPIR.Query. This algorithm will take as input a query index $q$ and retrieves block $B_q$. Our algorithm is defined using a constant $0 < \epsilon < 1$, which will be defined later.

$(\text{count}', \text{unused}', O'_1, \ldots, O'_c, \pi'_1, \ldots, \pi'_c, B_q) \leftarrow \text{SublinearPIR.Query}(q, \text{count}, \text{unused}, O_1, \ldots, O_c, \pi_1, \ldots, \pi_c)$ 1. While $q \in \{\pi_{\text{unused}}(1), \ldots, \pi_{\text{unused}}(k)\}$:
   (a) Increment unused by 1.
   (b) If unused $> c$, abort.
2. Initialize $S \leftarrow \{q, \pi_{\text{unused}}(1), \ldots, \pi_{\text{unused}}(k)\}$.
3. Execute $(K, r) \leftarrow \text{PRPartition.GenerateKey}(n, k+1, S)$.
4. Execute request $\leftarrow \text{PIR.ClientQuery}(r)$.
5. Send (request, $K$) to the server.
6. Server executes $(P_1, \ldots, P_{n/(k+1)}) \leftarrow \text{PRPartition.GetPartition}(K)$.
7. For $i = 1, \ldots, \frac{n}{k+1}$:
   (a) Server computes $T_i = \sum_{j \in P_i} B_j$.
8. Server executes response $\leftarrow \text{PIR.ServerReply}(\text{request}, T_1, \ldots, T_{n/(k+1)})$.
9. Server sends response back to client.
10. Execute $B_q \leftarrow \text{PIR.Decode}(\text{response}) - O_{\text{unused}}$.
11. Increment count by 1.
12. If count $= (1-\epsilon)c$ then
    (a) Execute $(\text{count}', \text{unused}', O'_1, \ldots, O'_c, \pi'_1, \ldots, \pi'_c) \leftarrow \text{SublinearPIR.Init}()$.
    (b) Return $(\text{count}', \text{unused}', O'_1, \ldots, O'_c, \pi'_1, \ldots, \pi'_c, B_q)$.
13. Otherwise, if count $< (1-\epsilon)c$ then
    (a) Return $(\text{count}, \text{unused}, O_1, \ldots, O_c, \pi_1, \ldots, \pi_c, B_q)$.

OCP.GenerateKey. This algorithm generates $k$ keys and integers describing a partition of $[n]$ into $n/k$ parts of size $k$ such that one part is equivalent to an subset $S$ of size $k$ where $n$, $k$ and $S \subseteq [n]$ are all inputs.

$(\mathcal{K}_1, \ldots, \mathcal{K}_k, v_1, \ldots, v_k) \leftarrow$ OCP.GenerateKey$(n, k, S)$ 1. Initialize array rank as an ordered set with the elements of $S$. The value rank$[i]$ will represent the rank of the $i$-th smallest item in $S$ for all $i \in [|S|]$.

2. Pick random row $r \in [n/k]$ and permutation $\tau : [k] \to [k]$ to embed $S$ into row $r$ such that the $\tau(i)$-th smallest item in $S$ appears in the $i$-th column.

3. Initialize idx $\leftarrow 1$.

4. While idx $\leq k$:
   (a) Generate random key $\mathcal{K}$.
   (b) Initialize next $\leftarrow n - k(\text{idx} - 1)$.
   (c) Execute $T_\mathcal{K} \leftarrow$ ExtractSubset(next, $n/k$, $\mathcal{K}$).
   (d) Set $v \leftarrow T_\mathcal{K}[r] - S[\tau(\text{idx})] \mod \text{next}$. As a result, we fix $T_\mathcal{K}$ such that the $r$-th entry is the $\tau(\text{idx})$-th entry of $S$. Formally, $T_\mathcal{K}[r] - v = S[\tau(\text{idx})] \mod \text{next}$.
   (e) If the intersection of $\{T_\mathcal{K}[i] - v : i \in [n/k]\}$ and $S$ contains more than one unused element, go back to Step 4a. Otherwise, the only unused element will be the $\tau(\text{idx})$-th smallest element of $S$.
   (f) $T_\mathcal{K}$ can be used as the idx-th column subset. Set $\mathcal{K}_{\text{idx}} \leftarrow \mathcal{K}$ and $v_{\text{idx}} \leftarrow v$ to return later.
   (g) Mark rank$[\tau(\text{idx})]$ as used.
   (h) Copy $T'_\mathcal{K} \leftarrow T_\mathcal{K}$ and sort $T'_\mathcal{K}$ in ascending order.
   (i) For all $i \leftarrow 1, \ldots, |S|$:
      i. Find minimum $j \in [n/k]$ such that $T'_\mathcal{K}[j+1] > \text{rank}[i]$ using binary search. Note, this implies that $j$ elements were chosen in $T_\mathcal{K}$ that were smaller than rank$[i]$.
      ii. Re-adjust rank$[i] \leftarrow \text{rank}[i] - j$.
   (j) Increment idx by one.

5. Return $(\mathcal{K}_1, \ldots, \mathcal{K}_k, v_1, \ldots, v_k)$.

FIG. 4E

OCP.ExtractPartition. This algorithm takes the succinct representation, $(\mathcal{K}_1, \ldots, \mathcal{K}_k, v_1, \ldots, v_k)$ of a partition of $[n]$ into $n/k$ parts of size $k$ and outputs the explicit partition.

$(P_1, \ldots, P_{n/k}) \leftarrow \text{OCP.ExtractPartition}(n, \mathcal{K}_1, \ldots, \mathcal{K}_k, v_1, \ldots, v_k)$ 1. Initialize $P_1, \ldots, P_{n/k}$ to be empty arrays.
2. Initialize $T \leftarrow [n]$ as an ordered set.
3. For $i \leftarrow 1, \ldots, k$:
    (a) Execute $T_{\mathcal{K}_i} \leftarrow \text{ExtractSubset}([T], n/k, \mathcal{K}_i)$.
    (b) For each $j \leftarrow 1, \ldots, n/k$:
        i. Retrieve $v$ to be the $(T_{\mathcal{K}_i}[j])$-th smallest item in $T$.
        ii. Append $v$ to $P_j$.
    (c) For each $j \leftarrow 1, \ldots, n/k$:
        i. Remove the $(T_{\mathcal{K}_i}[j])$-th smallest item from $T$.
4. Return $(P_1, \ldots, P_{n/k})$.

FIG. 4F

PRIVATE INFORMATION RETRIEVAL WITH SUBLINEAR PUBLIC-KEY OPERATIONS

CROSS REFERENCE TO RELATED APPLICATIONS

This U.S. patent application is a continuation of, and claims priority under 35 U.S.C. § 120 from, U.S. patent application Ser. No. 17/053,648, filed on Nov. 6, 2020, which claims priority under 35 U.S.C. § 371 from PCT/US2018/031369, filed on May 7, 2018. The disclosures of these prior applications are considered part of the disclosure of this application and are hereby incorporated by reference in their entireties.

TECHNICAL FIELD

This disclosure relates to private information retrieval with sublinear encrypted operations.

BACKGROUND

Enterprises and individuals are using distributed storage systems (i.e., cloud storage services) to store data on memory overlying multiple memory locations. In order to use essential functionalities offered by the cloud storage services, such as performing search queries on stored data, enterprises are required to provide plaintext access to the cloud storage services. As a result, many government and sensitive private sectors, such as health, finance, and legal, or reluctant to use cloud storage services, despite their increased convenience and cost advantages. For instance, data access patterns by users can provide a significant amount of information about the data and/or the user.

Private information retrieval (PIR) schemes allow a user to retrieve data from one or more storage devices while not revealing any knowledge about the user or the retrieved data to a server hosting the one or more storage devices. For PIR, server storage devices are generally not protected and private information is retrieved from either a public storage device or a server storage device with a group of subscribers all permitted to download data from the entire storage device. While users may simply download all of the content from a server storage device so that access patterns are not revealed, this takes too long when having to download all the contents from a cloud storage service spanning multiple storage devices. Moreover, conventional PIR schemes allowing access to multiple users generally require the users to be stateless in order to allow simultaneous and independent querying without collisions or conflicts between the users. Since the users do not hold any state, these conventional PIR schemes are computational expensive requiring the server to perform $\Omega(n)$ encrypted operations for a database of n blocks.

SUMMARY

In a single-server Private Information Retrieval (PIR) system with multiple clients, the server will store a set of plaintext blocks of data on storage resources. While the server is responsible for generating and storing the data blocks, a client retrieving a specific data block from the storage resources wants the guarantee that the server will be unable to identify which block was retrieved by the client. For instance, the plaintext data blocks may include machine learning models that the server generates and distributes for a multiplicity of different applications. If clients retrieved machine learning models in the plaintext, the server, and ultimately an entity associated with the server, would be able to learn important private information about the clients without the guarantees provided by PIR.

In existing PIR protocols that employ two or more servers, each jointly responsible for hosting the plaintext data to provide access by multiple clients, there is an assumption that the servers are non-colluding, i.e., the servers do not share information amongst themselves. However, in real-world scenarios, the multi-server PIR protocol is infeasible since the different entities associated with the servers that jointly host the plaintext data could be competitors with one another. On the other hand, existing PIR protocols that employ a single-server, require client devices to not hold state in order to ensure that the client devices can simultaneously access plaintext data blocks independently from one another. However, as modern client devices such as smart phones allow applications to store 100 megabytes of data, the requirement of stateless clients is wasteful and computationally expensive due to the number of encrypted operations the single server has to be perform.

Implementations herein are directed toward a single-server PIR routine that employs an asynchronous client storage model where each client is allowed to keep state independently from the state of the other clients. Accordingly, client devices may update their state independently from the state of the other client devices after performing a query for plaintext data blocks stored on storage resources managed by the server. Similarly, when a client's state is lost, only that client needs to perform computations with the server to regain the state. As a result of allowing the clients to utilize their local storage to keep state independently from one another, the single-server PIR routine drastically improves computational efficiency by minimizing the number of encrypted operations needed to ensure that data blocks are retrieved in a manner that is oblivious to the server. For instance, 1-million encrypted operations (exponentiation) requires minutes of CPU time, while 1-million plaintext operations (e.g., addition/XOR) requires less than a second time.

While oblivious random access memory (RAM) protocols also use local client storage to improve efficiency, oblivious RAM protocols often sacrifice the ability to perform queries from multiple clients easily. For instance, oblivious RAM protocols that use local client storage require the clients to have synchronized states such that not only does a querying client need to update state, all other non-querying clients must also update there state. As a result, in order to keep the client states synchronized, either the clients need to communicate with one another or the server has to keep track of the states of each client, thereby leading to larger storage costs for the server. Moreover, most oblivious RAM protocols do not allow clients to access the storage resources in parallel, or require client-to-client communication for parallel oblivious RAM protocols.

On the other hand, Doubly Efficient PIR protocols achieve faster computational times at the cost of trusting all of the clients to share a private key and be honest with one another. For instance, Doubling Efficient PIR protocols avoid performing operations on each storage resource element through the use of smooth, locally decodable codes (e.g., Reed-Muller code), but require the use of a designated client model that requires each client to share a single private key to query the storage resources. In scenarios where multiple clients share the single private key, a single client leak of the private key to the server can allow the server to determine all of the queried indices of all clients. Moreover, Doubly Efficient PIR protocols must store poly (N, q) database sizes to be able to handle q queries securely. After q queries, the database must be re-initialized privately by a single client and new keys must be provided to all clients. By allowing clients to hold state, the single-server PIR routine of the present disclosure avoids re-initializing across many clients, and after a specific client performs q queries, only that client has to update state with the server to continue efficient querying, while other clients maintain their state and are free to continue querying.

One aspect of the present disclosure provides a method for obliviously retrieving data blocks on an untrusted storage device using private information retrieval (PIR). The method includes initializing, by data processing hardware of a client device, a client state on the client device by executing a private batched sum retrieval instruction to compute c sums O of data blocks from an untrusted storage device, each computed sum O stored on memory hardware of the client device and including a sum of a corresponding subset S of exactly k data blocks. The method also includes executing, by the data processing hardware, a query instruction to retrieve a query block $B_q$ stored on the untrusted storage device by: iterating through each of the c sums O of data blocks stored on the memory hardware to identify one of the c sums O that does not include the query block $B_q$; instructing a service managing the untrusted storage device to pseudorandomly partition the untrusted storage device of n data blocks into $$\frac{n}{k+1}$$

partitions each containing k+1 data blocks and summing the k+1 data blocks in each of the $$\frac{n}{k+1}$$

partitions to determine a corresponding encrypted data block sum for each of the $$\frac{n}{k+1}$$

partitions, one of the $$\frac{n}{k+1}$$

partitions including a fixed partition that includes the identified c sum O of data blocks that does not include the query block $B_q$; retrieving the encrypted data block sum for the $$\frac{n}{k+1}$$

partition that includes the fixed partition from the service managing the untrusted storage device; and decrypting and subtracting the encrypted data block sum from the identified c sum O of data blocks stored on the memory hardware of the client device to obtain the query block $B_q$. The method also includes determining, by the data processing hardware (124), whether the number of queries (q) exceeds a query threshold and re-initializing, by the data processing hardware (124), the client state when the number of queries (q) exceeds the query threshold.

Implementations of the disclosure may include one or more of the following optional features. In some implementations, executing the private batched sum retrieval instruction to compute the c sums O of data blocks includes: streaming every data block stored on the untrusted storage device to the client device, the untrusted storage device storing n data blocks; assigning selected data blocks streamed from the untrusted storage device to corresponding subsets S of c subsets S of data blocks; and computing each c sum O of data blocks by summing the selected data blocks assigned to the corresponding subset S. In other implementations, executing the private batched sum retrieval instruction to compute the c sums O of data blocks includes downloading m data blocks from the untrusted storage device to compute the c sums O of data blocks for storage on the memory hardware. Here, the number of m data blocks downloaded by the client device is equal to the product between the number of k data blocks and the number of c sums O of data blocks.

In even other implementations, executing the private batched sum retrieval instruction to compute the c sums O of data blocks includes: sending a private information retrieval request from the client device to a service managing the untrusted storage device to retrieve the t data blocks from each of the k buckets, the private information request causing the service to encrypt and store each t data block as a corresponding private information retrieval result on the untrusted storage device; generating a vector of additively homomorphic encryptions; uploading the vector of additively homomorphic encryptions to the untrusted storage device, the vector of additively homomorphic encryptions causing the service managing the untrusted storage device to execute an additive homomorphic encryption computation on the private information retrieval results using the vector of additively homomorphic encryptions, the additive homomorphic encryption computation corresponding to a ciphertext value for the corresponding c sum O of data blocks; and receiving and decrypting the ciphertext from the service managing the untrusted storage device to obtain the corresponding c sum O of data blocks. The additive homomorphic encryption computation includes a dot product computation. Additionally or alternatively, t may be equal to one.

In some examples, instructing a service managing the untrusted storage device to pseudorandomly partition the untrusted storage device of n data blocks into $$\frac{n}{k+1}$$

partitions includes generating a vector of pseudorandom permutation partitioning keys (κ) that includes the instructions for pseudorandomly partitioning the untrusted storage device of n data blocks into $$\frac{n}{k+1}$$

partitions, and sending a request from the client device to the service managing the untrusted storage device that includes the vector of pseudorandom permutation partitioning keys, the request causing the service to pseudorandomly partition the untrusted storage device of n data blocks into the $$\frac{n}{k+1}$$

partitions with one of the $$\frac{n}{k+1}$$

partitions including the fixed partition that includes the identified c sum O of data blocks that does not include the query block $B_q$. The pseudorandom partition includes a two-dimensional matrix with each row including a corresponding partition and each column including an incrementally generated pseudorandom permutation for a corresponding one of the k+1 blocks in each partition.

A system aspect of the present disclosure provides a method for obliviously retrieving data blocks on an untrusted storage device using private information retrieval (PIR). The system includes data processing hardware of a client device and memory hardware of the client device in communication with the data processing hardware. The memory hardware stores instructions that when executed by the data processing hardware cause the data processing hardware to perform operations that includes initializing a client state on the client device by executing a private batched sum retrieval instruction to compute c sums O of data blocks from an untrusted storage device, each computed sum O stored on memory hardware of the client device and including a sum of a corresponding subset S of exactly k data blocks. The operations also include executing a query instruction to retrieve a query block $B_q$ stored on the untrusted storage device by: iterating through each of the c sums O of data blocks stored on the memory hardware to identify one of the c sums O that does not include the query block $B_q$; instructing a service managing the untrusted storage device to pseudorandomly partition the untrusted storage device of n data blocks into $$\frac{n}{k+1}$$

partitions each containing k+1 data blocks and summing the k+1 data blocks in each of the $$\frac{n}{k+1}$$

partitions to determine a corresponding encrypted data block sum for each of the $$\frac{n}{k+1}$$

partitions, one of the $$\frac{n}{k+1}$$

partitions including a fixed partition that includes the identified c sum O of data blocks that does not include the query block $B_q$; retrieving the encrypted data block sum for the $$\frac{n}{k+1}$$

partition that includes the fixed partition from the service managing the untrusted storage device; and decrypting and subtracting the encrypted data block sum from the identified c sum O of data blocks stored on the memory hardware of the client device to obtain the query block $B_q$. The method also includes determining whether the number of queries (q) exceeds a query threshold and re-initializing the client state when the number of queries (q) exceeds the query threshold.

This aspect of the present disclosure may include one or more of the following optional features. In some implementations, executing the private batched sum retrieval instruction to compute the c sums O of data blocks includes; streaming every data block stored on the untrusted storage device to the client device, the untrusted storage device storing n data blocks; assigning selected data blocks streamed from the untrusted storage device to corresponding subsets S of c subsets S of data blocks; and computing each c sum O of data blocks by summing the selected data blocks assigned to the corresponding subset S. In other implementations, executing the private batched sum retrieval instruction to compute the c sums O of data blocks includes downloading m data blocks from the untrusted storage device to compute the c sums O of data blocks for storage on the memory hardware. Here, the number of m data blocks downloaded by the client device is equal to the product between the number of k data blocks and the number of c sums O of data blocks.

In even other implementations, executing the private batched sum retrieval instruction to compute the c sums O of data blocks includes: sending a private information retrieval request from the client device to a service managing the untrusted storage device to retrieve the t data blocks from each of the k buckets, the private information request causing the service to encrypt and store each t data block as a corresponding private information retrieval result on the untrusted storage device; generating a vector of additively homomorphic encryptions; uploading the vector of additively homomorphic encryptions to the untrusted storage device, the vector of additively homomorphic encryptions causing the service managing the untrusted storage device to execute an additive homomorphic encryption computation on the private information retrieval results using the vector of additively homomorphic encryptions, the additive homomorphic encryption computation corresponding to a ciphertext value for the corresponding c sum O of data blocks; and receiving and decrypting the ciphertext from the service managing the untrusted storage device to obtain the corresponding c sum O of data blocks. The additive homomorphic encryption computation includes a dot product computation. Additionally or alternatively, t may be equal to one.

In some examples, instructing a service managing the untrusted storage device to pseudorandomly partition the untrusted storage device of n data blocks into $$\frac{n}{k+1}$$

partitions includes generating a vector of pseudorandom permutation partitioning keys (κ) that includes the instructions for pseudorandomly partitioning the untrusted storage device of n data blocks into $$\frac{n}{k+1}$$

partitions; and sending a request from the client device to the service managing the untrusted storage device that includes the vector of pseudorandom permutation partitioning keys, the request causing the service to pseudorandomly partition the untrusted storage device of n data blocks into the $$\frac{n}{k+1}$$

partitions with one of the $$\frac{n}{k+1}$$

partitions including the fixed partition that includes the identified c sum O of data blocks that does not include the query block $B_q$. The pseudorandom partition includes a two-dimensional matrix with each row including a corresponding partition and each column including an incrementally generated pseudorandom permutation for a corresponding one of the k+1 blocks in each partition.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4A provides an example algorithm for generating a vector of pseudorandom partitioning keys.

FIG. 4B provides an example algorithm for partitioning a database using a vector of pseudorandom partitioning keys generated by a client device.

FIG. 4C provides an example algorithm for initializing a client device state by executing a private batch code routine.

FIG. 4D provides an example algorithm for executing a query instruction to obliviously retrieve a query block from an untrusted storage device.

FIG. 4E provides an example algorithm for generating pseudorandom function keys.

FIG. 4F provides an example algorithm for partitioning a database and extracting a fixed partition using pseudorandom partitioning keys generated by a client device.

Like reference symbols in the various drawings indicate like elements.

DETAILED DESCRIPTION

Implementations herein are directed toward a single-server private information retrieval (PIR) routine that allows multiple client devices, each having an asynchronous state, to obliviously retrieve data blocks stored on untrusted memory managed by a service provider. The untrusted memory may include storage resources of a distributed storage system that executes in a cloud-environment accessible to the client devices. The data blocks stored on the untrusted memory are publically-known and un-encrypted (e.g., plaintext). Thus, the single-server PIR routine with multiple client devices having independent storage (e.g., asynchronous state) effectively conceals access patterns of the publically-known and un-encrypted data from the untrusted memory. In one example, the service provider managing storage resources (e.g., untrusted memory), may generate machine learning models for distribution to client devices. Here, the server provider may store the generated machine learning models as data blocks on the storage resources and the client devices may query for specific machine learning models using private information about the client. The single-server PIR routine prevents the service provider that distributes the machine learning models from learning which machine learning model was retrieved by a client device. In another example, client devices undergoing a factory reset often check whether the client device is associated with an enterprise group or an individual. A manufacturer of the client device (or provider of an operating system or other software executing on the client device) may store a set of enterprise identifiers and associated client identifiers as plaintext. While extra operations may be required for completing the factory reset when the client device belongs to a specific enterprise group, the single-server PIR routine ensures that the client identifier associated with the client device is never leaked to the manufacturer when the client device does not belong to an enterprise group.

The asynchronous state refers to each client device having independent storage from the other client devices to allow the client devices to update their state independently from one another after performing a query for data stored on the untrusted memory. Similarly, when a client device decides to release state, the queries of all the other client devices remains hidden from the server managing the untrusted memory. To construct the single-server PIR routine and provide more efficient online querying at a later time, the client devices first initialize their state by executing a private batched sum retrieval routine, and thereafter executing a constrained pseudorandom partitioning instruction that allows the client devices to communicate fixed partitions to the service managing the untrusted memory when the client devices execute queries for data blocks stored on the untrusted memory.

Figure 1A:
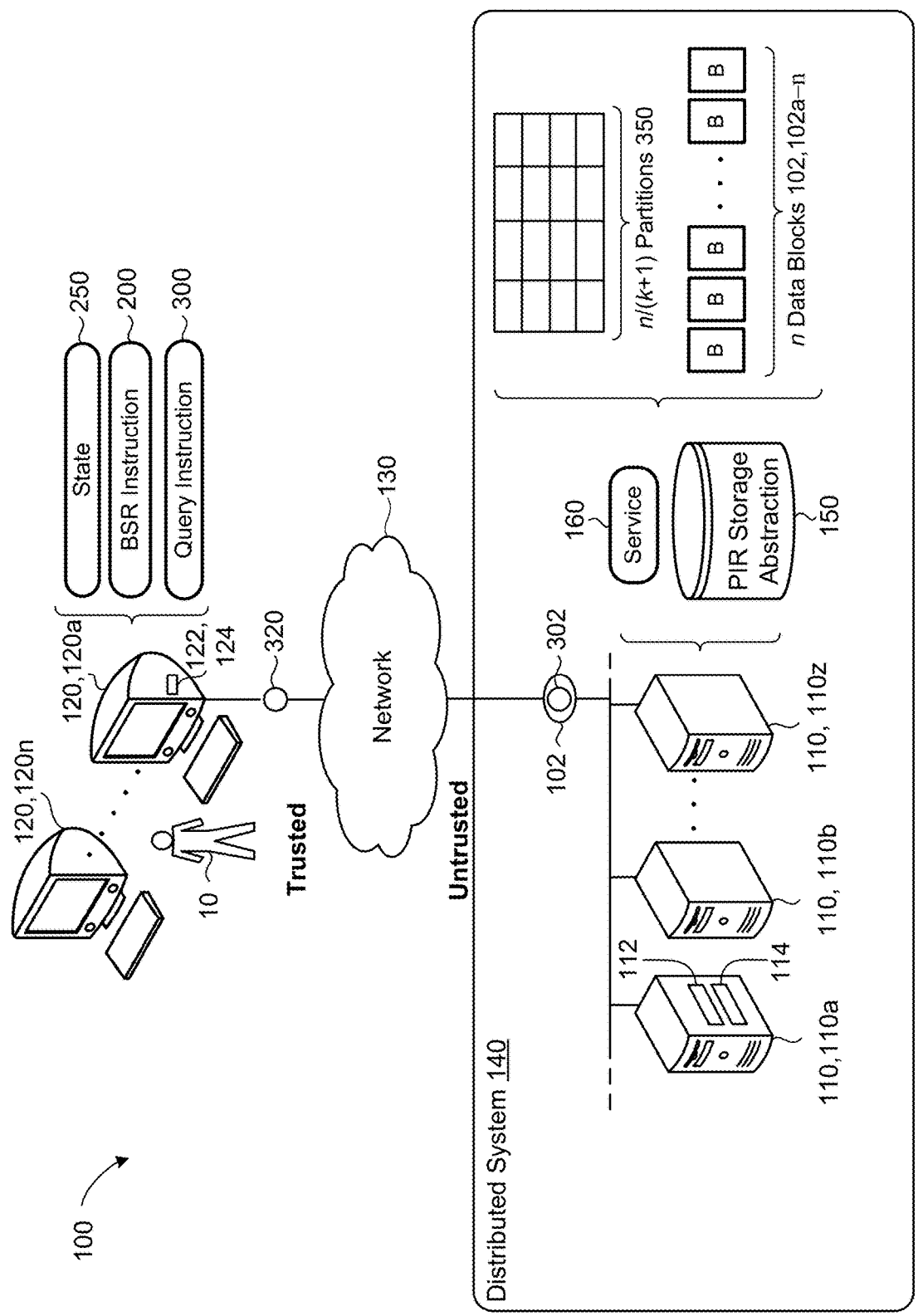
FIG. 1A is a schematic view of an example private information retrieval system that allows oblivious access to data blocks stored on non-transitory data storage of a distributed system to multiple client devices holding state.
Figure 1B:
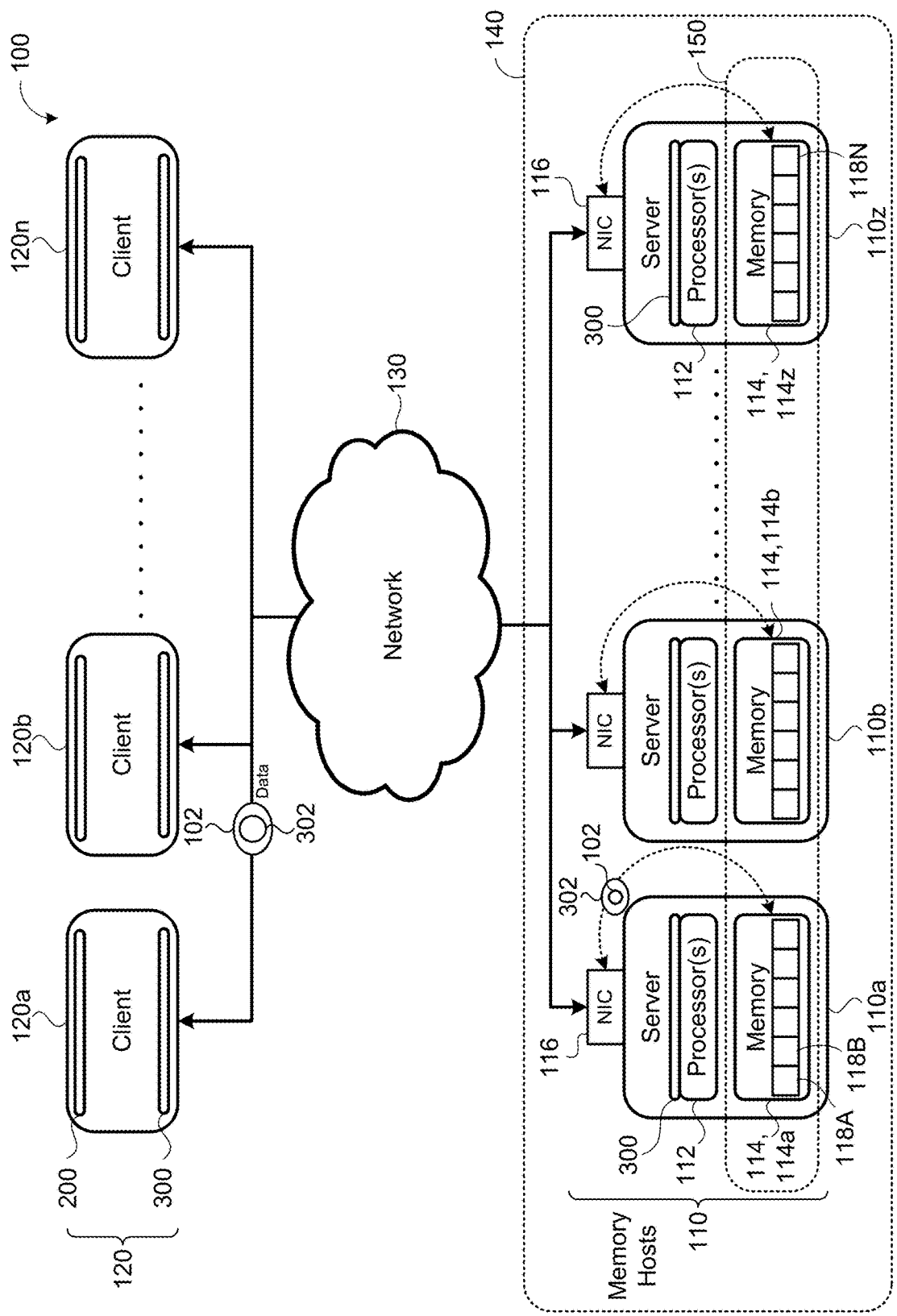
FIG. 1B is a schematic view of an example private information retrieval system that allows oblivious access to data blocks stored on non-transitory data storage of a distributed system to multiple client devices holding state.

FIGS. 1A and 1B depict an example system 100 for storing publically-known and un-encrypted n data blocks (B) 102 on a distributed system 140 and allowing multiple client devices 120, 120a-n holding asynchronous state 250 to use private information retrieval (PIR) for obliviously retrieving data blocks (B) 102 to conceal access patterns while preserving search functionalities on the data blocks (B) 102 by the client devices 120. Thus, the client device 120 may not own the data blocks 102 and the content of the data blocks 102 are available to the public in configurations. A client device 120 (e.g., a computer) associated with the client 10 communicates, via a network 130, with the distributed system 140 having a scalable/elastic non-transitory storage abstraction 150. The client device 120 may include associated memory hardware 122 and associated data processing hardware 124. Each client device 120 may leverage the associated memory hardware 122 to hold a state 250 for storing one or more of the data blocks (B) 102 when executing query instructions 300 to query for data blocks (B) 102 stored on the storage abstraction 150. The storage abstraction 150 (e.g., file system, data store, etc.) is overlain on storage resources 114 to allow scalable use of the storage resources 114 by one or more client devices 120.

In some implementations, the distributed system 140 executes a computing device 112 (e.g., server) that manages access to the storage abstraction 150. For instance, the server may generate and store data blocks on the storage abstraction in the plaintext, and the client devices 120 may retrieve the data blocks 102 in the plaintext from the storage abstraction 150. While the example shown depicts the system 100 having a trusted side associated with the client devices 120 in communication, via the network 130, with an untrusted side associated with the distributed system 140, the system 100 may be alternatively implemented on a large intranet having a trusted computing device(s) (CPU) and untrusted data storage. The untrusted side associated with the distributed system 140 or data storage is considered "honest-but-curious", in that the computing device 112 follows the protocol honestly but may perform any probabilistically polynomial time algorithm using information leaked by the distributed system 140 to gain additional insight.

In some implementations, the distributed system 100 includes resources 110, 110a-z. The resources 110 may include hardware resources and software resources. The hardware resources 110 may include computing devices 112 (also referred to as data processing devices and data processing hardware) or non-transitory memory 114 (also referred to as memory hardware and storage resources). The software resources 110 may include software applications, software services, application programming interfaces (APIs) or the like. The software resources 110 may reside in the hardware resources 110. For example, the software resources 110 may be stored in the memory hardware 114 or the hardware resources 110 (e.g., the computing devices 112) may be executing the software resources 110.

A software application (i.e., a software resource 110) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The memory hardware 114, 122 may be physical devices used to store programs (e.g., sequences of instructions) or data (e.g., program state information) on a temporary or permanent basis for use by a computing device 112 and/or the client devices 120 (i.e., the data processing hardware 124 of the client devices 120). The memory hardware 114, 122 may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), oblivious random access memory (ORAM), dynamic random access memory (DRAM), static random access memory (SRAM), phase change memory (PCM) as well as disks or tapes.

The network 130 may include various types of networks, such as local area network (LAN), wide area network (WAN), and/or the Internet. Although the network 130 may represent a long range network (e.g., Internet or WAN), in some implementations, the network 130 includes a shorter range network, such as a local area network (LAN). In some implementations, the network 130 uses standard communications technologies and/or protocols. Thus, the network 130 can include links using technologies, such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, Bluetooth, Bluetooth Low Energy (BLE), etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of the links can be encrypted using conventional encryption technologies, such as secure sockets layer (SSL), transport layer security (TLS), virtual private networks (VPNs), Internet Protocol security (IPsec), etc. In other examples, the network 130 uses custom and/or dedicated data communications technologies instead of, or in addition to, the ones described above.

The data blocks 102 correspond to atomic units of data and each have size B bytes each. For example, a typical value for B for storage on a distributed system may be 64 KB to 256 B. A notation n denotes a number of the data blocks 102 associated with the storage resource(s) 114 and stored on the storage abstraction 150 using PIR. Each of the n data blocks (B) 102 is stored at a corresponding memory location 118, 118a-n (FIG. 1B) of the storage abstraction 150 overlain across the memory hardware 114. Specifically, the n data blocks (B) 102 are associated with PIR storage whereby the n data blocks (B) 102 are stored on one or more storage resources 114 and are un-encrypted and available to the public. For instance, the un-encrypted and public data blocks (B) may be associated with machine learning models generated by the distributed system 140 and available for download by the client devices 120.

To provide more efficient querying for the publically-known plaintext data blocks 102 stored by the storage abstraction 150 (e.g., database) of the distributed system 140, each client device 120 initializes the corresponding state 250 by executing a private batched sum retrieval (BSR) instruction 200 that causes the client device 120 to compute c sums of O data blocks 120 from the storage abstraction 150 for storage on the memory hardware 122 of the client device 120. Here, each of the c computed sums O includes a sum of a corresponding subset S of exactly k data blocks 120. In some implementations, each client device 120 generates and applies a random permutation $(\pi_1, \pi_1, \ldots, \pi_k,)$ to each k block in a corresponding subset $S_1, S_2, \ldots, S_C$ before computing each c sums $O_1, O_2, \ldots O_C$ of data blocks 102. The client devices 120 may initialize state 250 and execute private BSR instructions 200 during downtimes (e.g., nighttime) in order to provide more efficient querying for data blocks 102 at later times. After performing a threshold number of queries, each client device 120 re-initializes its state 250 independently of the state 250 of the other client devices 120 and without interrupting querying by the other client devices 120.

The client devices 120 may select different private BSR instructions 200 based on one or more factors including, without limitation, size of the database (e.g., number of n data blocks 102), computational requirements, and/or bandwidth requirements. For instance, the private BSR instruction 200 may include a streaming private BSR instruction 200a, 200 (FIG. 2A) that streams every n data block 102 from the storage abstraction 150 and assign selected data blocks 102 to corresponding c subsets S for computing each c sum O of data blocks. In other examples, the private BSR instruction 200 includes a batched private BSR instruction 200b, 200 (FIG. 2B) that downloads m data blocks 102 from the storage abstraction 150 for computing the c sums O of data blocks. In yet other examples, the private BSR instruction 200 includes a batch code private BSR instruction 200c, 200 (FIGS. 2C-2E) that partitions the storage abstraction 150 into k buckets, and for each c sum O of data blocks 102 to be computed, downloads t data blocks from each of the k buckets to compute the corresponding sum O of data blocks 102 for storage on the memory hardware 122 (i.e., within the state 250). Generally, the streaming private BSR instruction 200a is most efficient for databases of smaller sizes, while the batch code private BSR instruction 200c is most efficient for databases of larger sizes. The batched private BSR instruction 200b may provide the best querying efficiencies on medium-sized databases.

After initializing state 250, a client device 120 executes a query instruction 300 to obliviously retrieve a query block $B_q$ stored on the storage abstraction 200. Here, the client device 120 iteratively searches through the corresponding state 250 to identify one of the c sums O that does not include the query block $B_q$. Upon identifying the c sums O that does not include the query block $B_q$, the client device 120 may send a partition request 320 that instructs a service (e.g., server) 160 managing the storage abstraction 150 to pseudorandomly partition the storage abstraction of n data blocks into $$\frac{n}{k+1}$$

partitions 350 each containing k+1 data blocks and summing the k+1 data blocks in each of the $$\frac{n}{k+1}$$

partitions to determine a corresponding encrypted data block sum 302 for each of the $$\frac{n}{k+1}$$

partitions. The partition 350 of $$\frac{n}{k+1}$$

partitions includes a two-dimensional matrix. Advantageously, the partition request 320 embeds a fixed partition that includes the identified c sum O to one of the $$\frac{n}{k+1}$$

partitions, whereby the identified c sum O is embedded into a random row (e.g., $r^{th}$ row) of the two-dimensional matrix. Obliviously, the service 160 may return the encrypted data block sum 302 that includes the fixed partition for the identified c sum O of data blocks 102 (i.e., k data blocks) as well as the query block $B_q$ (e.g., the +1 block). Responsive to receiving the encrypted data block sum 302, the client device 120 (e.g. via the data processing hardware 124) decrypts and subtracts the encrypted data block sum 302 from the identified c sum O of data blocks 102 stored on the client device 120 to obtain the query block $B_q$. Thus, by executing the instruction 300, the client device 120 is able to retrieve the data block Bq without revealing the contents of the data block 102 as well as the sequence of the query executed by the client device 120 to the distributed system 140. The service 160 may execute on the data processing hardware 112.

Referring to FIG. 1B, in some implementations, the distributed storage system 140 includes loosely coupled memory hosts 110, 110a-z (e.g., computers or servers), each having a computing resource 112 (e.g., one or more processors or central processing units (CPUs)) in communication with storage resources 114 (e.g., memory hardware, memory hardware, flash memory, dynamic random access memory (DRAM), phase change memory (PCM), and/or disks) that may be used for caching data. The storage abstraction 150 overlain on the storage resources 114 allows scalable use of the storage resources 114 by one or more client devices 120, 120a-n. The client devices 120 may communicate with the memory hosts 110 through the network 130 (e.g., via remote procedure calls (RPC)). The computing resources 112 may execute the service 160.

In some implementations, the distributed storage system 140 is "single-sided," eliminating the need for any server jobs for responding to queries from client devices 120 to retrieve data blocks 102 from the storage abstraction 150 when the client devices 120 executes instructions 300 to execute queries (q) for data blocks 102. "Single-sided" refers to the method by which most of the request processing on the memory hosts 110 may be done in hardware rather than by software executed on CPUs 112 of the memory hosts 110. Additional concepts and features related to a single-sided distributed caching system can be found in U.S. Pat. No. 9,164,702, which is hereby incorporated by reference in its entirety.

The distributed system 140 may obliviously move data blocks 102 around the storage resources 114 (e.g., memory hardware) of the remote memory hosts 110 (e.g., the storage abstraction 200) and get the data blocks 102 from the remote memory hosts 110 via RPCs or via remote direct memory access (RDMA)-capable network interface controllers (NIC) 116. A network interface controller 116 (also known as a network interface card, network adapter, or LAN adapter) may be a computer hardware component that connects a computing device/resource 112 to the network 130. Both the memory hosts 110a-z and the client device 120 may each have a network interface controller 116 for network communications. The instruction 300 executing on the physical processor 112 of the hardware resource 110 registers a set of remote direct memory accessible regions/locations 118A-N of the memory 114 with the network interface controller 116. Each memory location 118 is configured to store a corresponding data block 102.

Figure 2A:
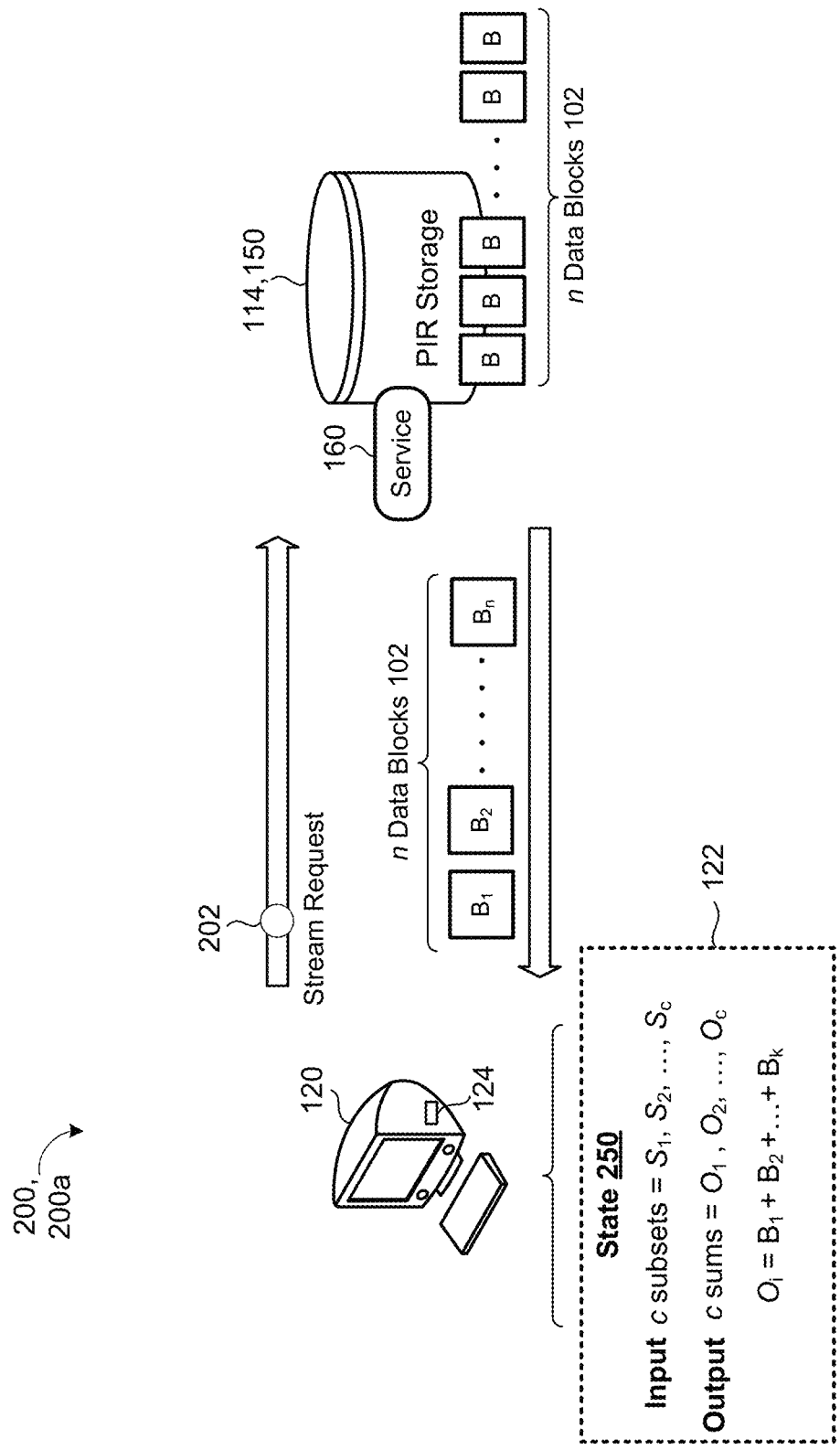
FIG. 2A is a schematic view of an example private batched sum retrieval instruction that streams an entire database from an untrusted storage device onto a client device holding state.

FIG. 2A provides an example streaming private BSR instruction 200a executing on the client device 120 to stream the entire contents of a PIR storage abstraction 114, 150 (e.g., storage abstraction/database) in order for computing the c sums O of data blocks 102 with each sum containing exactly k data blocks. To initiate the streaming of the n data blocks 102, the client device 102 may send a stream request 202 to the service 160 managing the PIR storage abstraction 150. Since all of the n data blocks 102 are streamed, the instruction 200a does not have to hide from the server 160 which data blocks 102 were accessed by the client device 120. The client device 120 may assign selected data blocks 102 in the stream to corresponding ones of the subsets $S_1$, $S_2$, . . . , $S_C$ among the c subsets of data blocks 102. Thereafter, the client device 120 computes each c sum $O_1$, $O_2$, . . . , $O_C$ (e.g., output) by summing the selected k data blocks assigned to the corresponding subset $S_1$, $S_2$, . . . , $S_C$ (e.g., input). For each subset S, the client device 120 may further apply a corresponding random permutation to each data block $B_1$, $B_2$, . . . , $B_k$ included in the subset S. The total number m of data blocks stored on the memory hardware 122 of the client device is equal the total number c of subsets S times the number of data blocks k assigned to each subset. The streaming private BSR instruction 200a may use O(n) bandwidth, O(m) additions, and O(c) local memory at the client device 120.

Figure 2B:
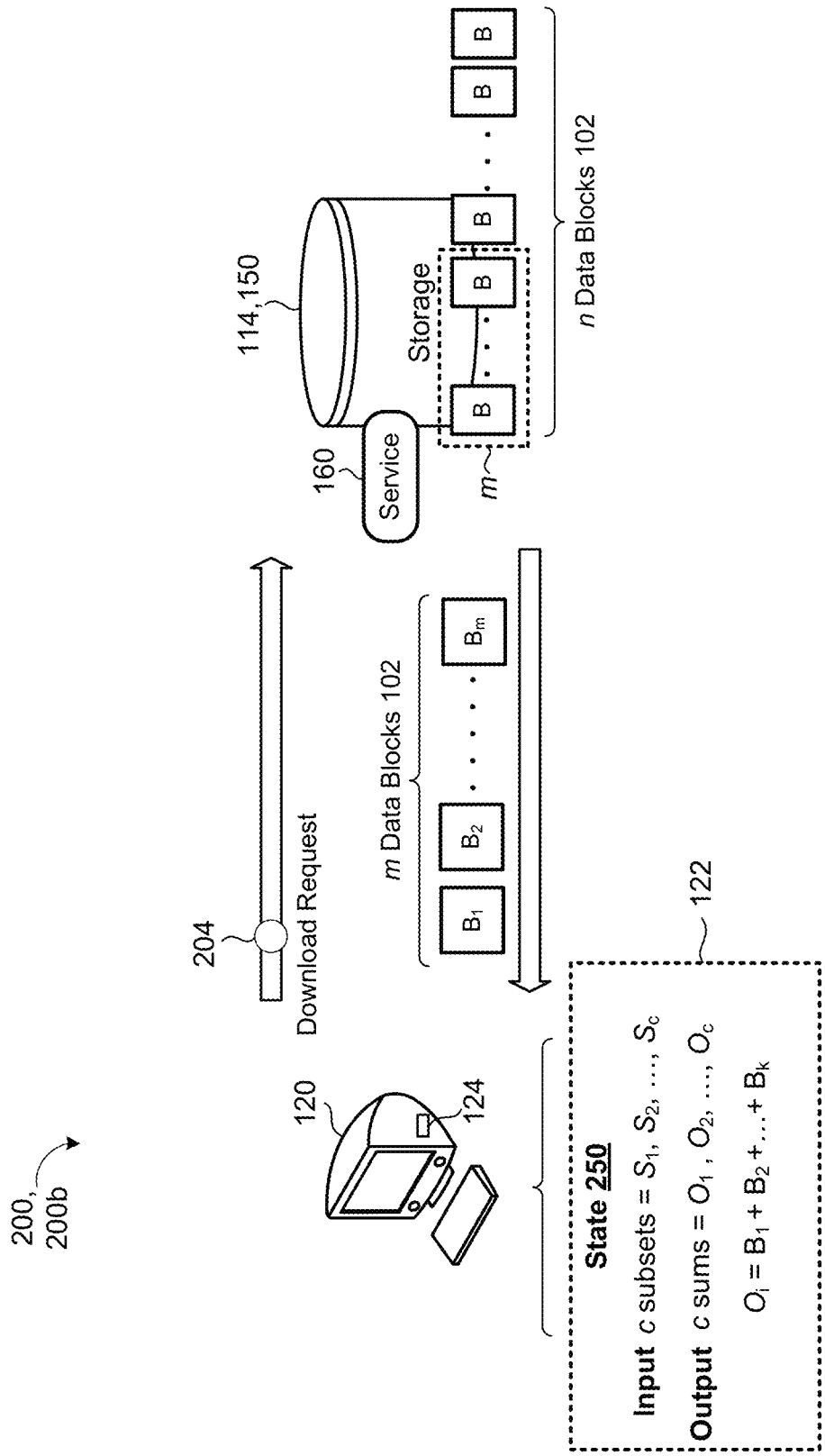
FIG. 2B is a schematic view of an example private batched sum retrieval instruction that downloads a specified number of data blocks from an untrusted storage device of a distributed system onto a client device holding state.

FIG. 2B provides an example batched private BSR instruction 200b executing on the client device 120 that causes the client device 120 to send a download request 204 to download exactly m data blocks from the PIR storage abstraction 114, 150 for computing the c sums O of data blocks 102 with each sum containing exactly k data blocks. Thus, whereas the streaming private BSR instruction 200b streams all n data blocks from the PIR storage abstraction 114, 150, the batched private BSR instruction 200b only downloads the m data blocks 102 needed to assemble the c subsets S of the client state 250. Since the number of m data blocks downloaded by the client device is equal to the product between the number of k data blocks and the number of c sums O of data blocks, the instruction 200b assigns exactly k data blocks to corresponding ones of the subsets $S_1$, $S_2$, . . . , $S_C$ among the c subsets of data blocks 102. Thereafter, the client device 120 computes each c sum $O_1$, $O_2$, . . . , $O_C$ (e.g., output) by summing the selected k data blocks assigned to the corresponding subset $S_1$, $S_2$, . . . , $S_C$ (e.g., input). For each subset S, the client device 120 may further apply a corresponding random permutation to each data block $B_1$, $B_2$, . . . , $B_k$ included in the subset S. The batched private BSR instruction 200b may use O(m log n+λ+mB) bandwidth and O(n) of computation.

Figure 2C:
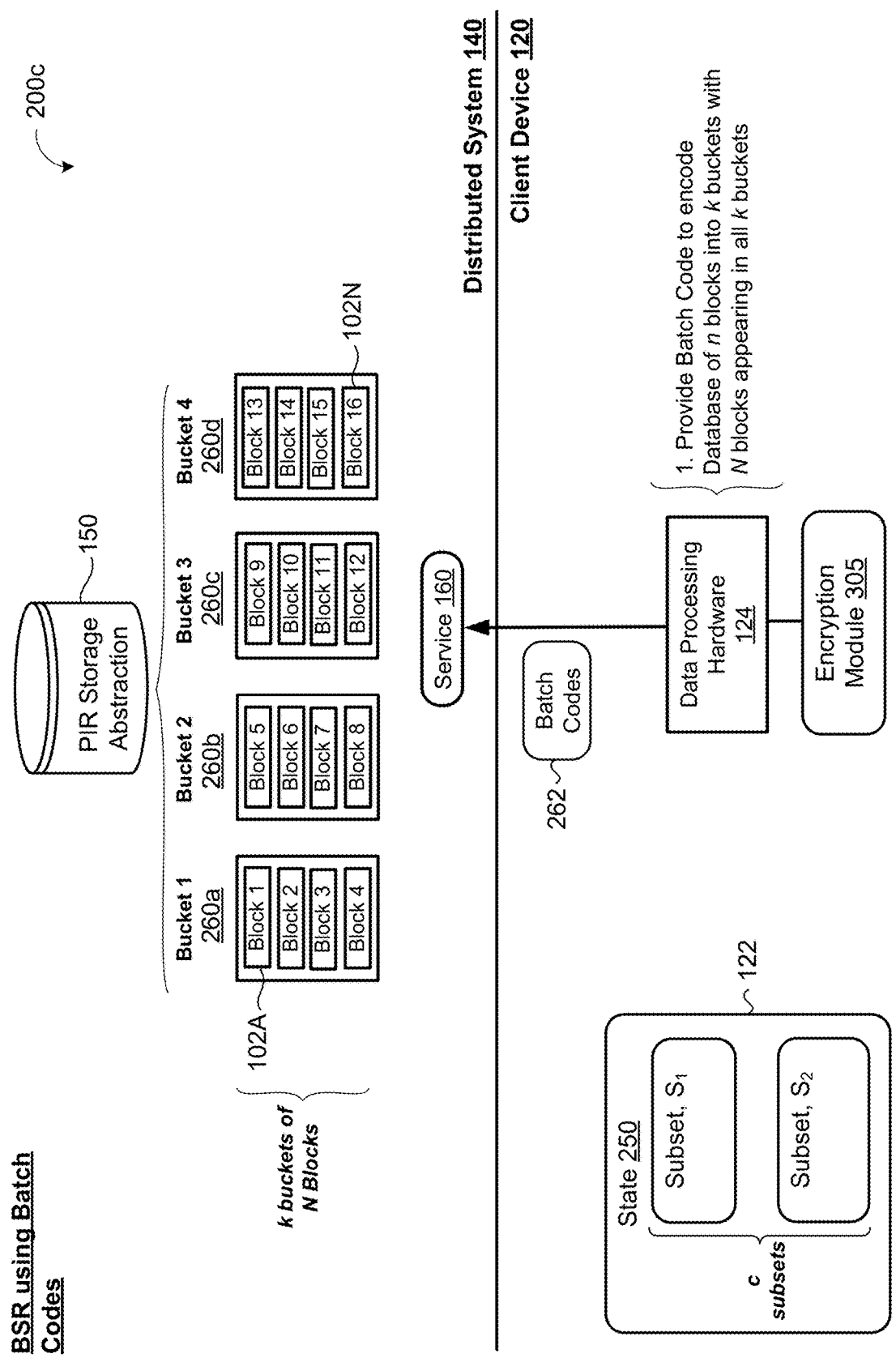
FIG. 2C-2E is a schematic view of an example private batched sum retrieval routine that uses batch codes from a client device to encode an untrusted storage device of a distributed system into a specified number of buckets each containing a uniform number of data blocks.
Figure 2D:
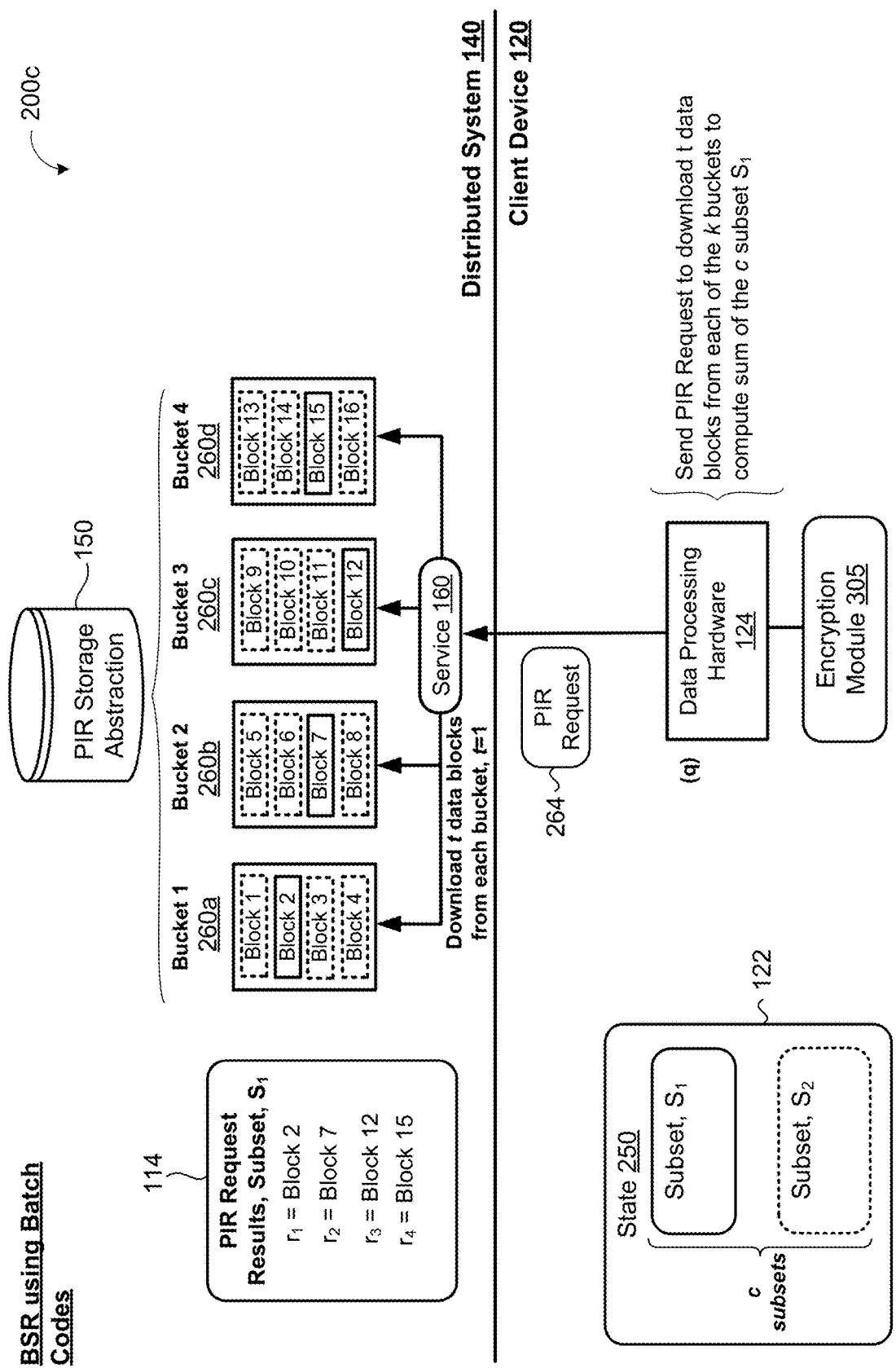
Figure 2E:
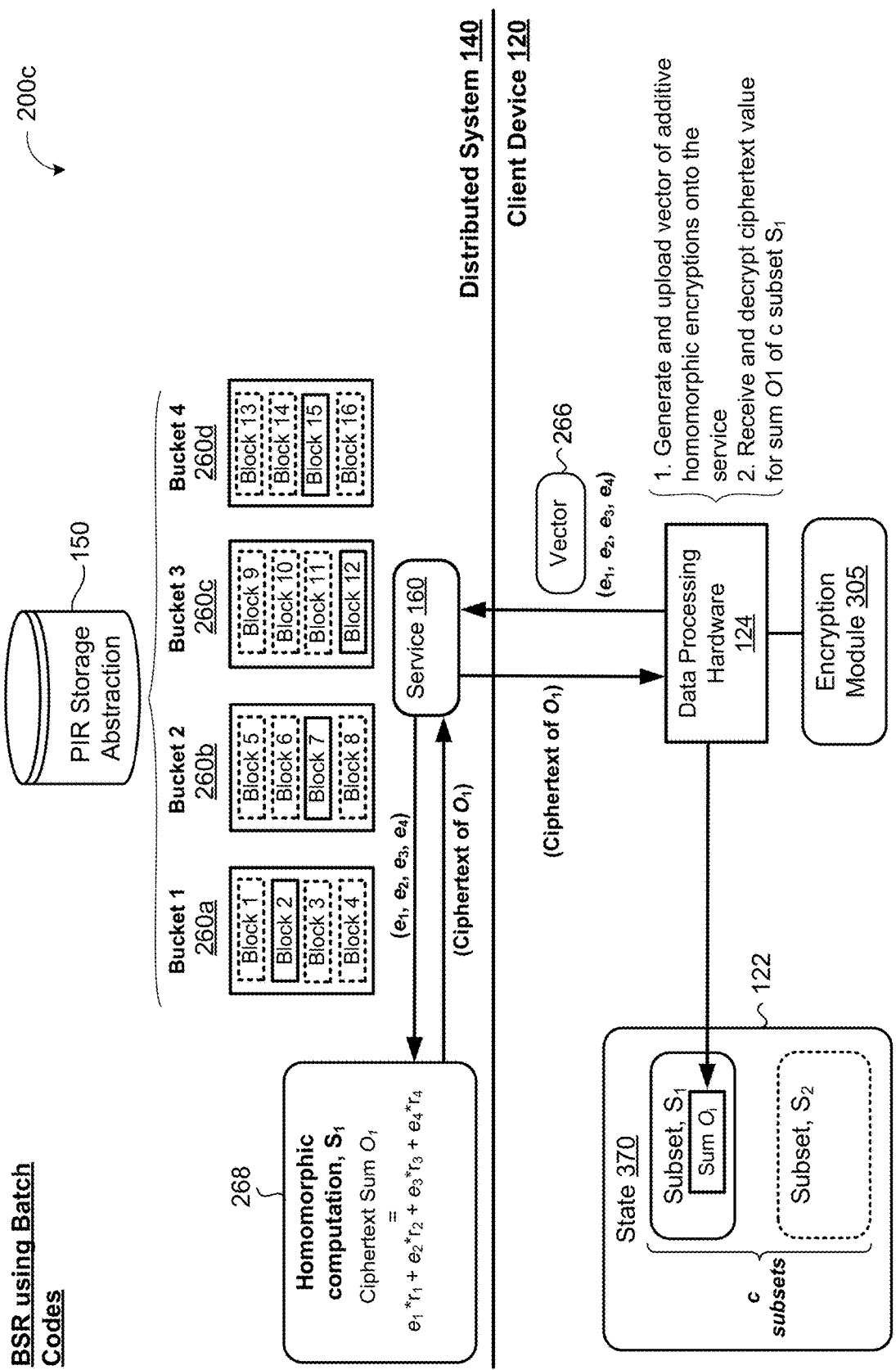

FIGS. 2C-2E provide an example batch code private BSR instruction 200b executing on the client device 120 that partitions/divides/segments the PIR storage abstraction 114, 150 of n data blocks into k buckets 260, and for each c sum O of data blocks 102 to be computed for storage on the client device 120, downloads t data blocks from each of the k buckets 260 to compute the corresponding sum O of data blocks 102. The smaller buckets 260 subdivide the storage abstraction 150 to increase bandwidth when the client device 120 is initializing the state 250 during execution of the batch code private BSR instruction 200b. The number of k buckets 260 partitioned at the distributed system 140 by the client device 120 is tunable based on security and/or bandwidth requirements. In the examples shown, the n data blocks 102 of the storage abstraction 150 is partitioned into four buckets 260, 260a-d such that the four buckets 250, 260a-d collectively include N (e.g., 16) data blocks 102A-102N. Moreover, the data blocks 102 within each k bucket 260 are encrypted using an encoding function.

FIG. 2C shows the client device initiating the instruction 200b by sending batch codes 262 to the service 160 that causes the service 160 to partition the storage abstraction 150 into the k buckets 250a-d and encode the N blocks 102 that appear in all k buckets using an encoding function. The batch codes 262 ensure that for any subset S with at most m items, the set of blocks 102 assigned to the corresponding subset S may be retrieved by reading at most t items in each of the k buckets 260. Implementations herein, set t equal to one (1). In some examples, the batch codes 262 include cuckoo batch codes. The client devices 120 may include an encryption module 305 in communication with the data processing hardware 124 to provide the batch codes 262. The encryption module 305 may include software executing on the data processing hardware 124 or may include a separate hardware that communicates with the data processing hardware 124. FIG. 2C further shows the state 250 of the client device 120 initializing to retrieve exactly k data blocks for first and second subsets $S_1$, $S_2$, e.g., c equals two subsets S. While only two subsets are shown by example, other examples may include more than two subsets.

FIG. 2D shows the client device 120, while executing the batch code private BSR instruction 200c, sending a PIR request 264 to the service 160 to download t data blocks 102 from each of the k buckets 260a-260d for the first subset $S_1$. While not shown, the client device 120 also sends a corresponding PIR request 264 to download t data blocks 102 from each of the k buckets for input to the second subset $S_2$. In response to receiving the PIR request 264, the service encrypts and stores each t data block 102 retrieved from the k buckets 260 as a corresponding private information retrieval result $r_1$, $r_2$, $r_3$, $r_4$ associated with the first subset $S_1$. Thus, the results are stored on the storage resources 114 of the distributed system 140. In the example shown, t is equal to one such that the service 160 randomly downloads, encrypts, and stores block 2 from Bucket 1 260a as PIR result $r_1$; downloads, encrypts, and stores block 7 from Bucket 2 260b as PIR result $r_2$; downloads, encrypts, and stores block 12 from Bucket 3 260c as PIR result $r_3$; and downloads, encrypts, and stores block 15 from Bucket 4 260d as PIR result $r_4$.

After sending the PIR request 304 to download the t data blocks 102 from each of the buckets 260 for the first subset $S_1$, the client device generates a vector of additively homomorphic encryptions 266 and uploads the vector of additively homomorphic encryptions ($e_1$, $e_2$, $e_3$, $e_4$) 266 to the distributed system 140 (e.g., the storage abstraction 150). In some examples, a homomorphic encryption $e_j$ is an encryption of one (1) if and only if the sum Oi to be computed requires the block 102 from the i-th bucket 260 as part of the sum and homomorphic encryption $e_j$ is an encryption of zero (0) otherwise. The vector of additively homomorphic encryptions ($e_1$, $e_2$, $e_3$, $e_4$) 266 causes the service 160 to execute an additive homomorphic encryption computation 268 on the private information retrieval results $r_1$, $r_2$, $r_3$, $r_4$ associated with the first subset $S_1$ using the vector of additively homomorphic encryptions ($e_1$, $e_2$, $e_3$, $e_4$) 266. The additive homomorphic encryption computation 268 corresponding to a ciphertext value for the corresponding c sum O of data blocks. Additively homomorphic encryptions allow the service 160 to perform the additive homomorphic encryption computation 268 so that the encoded results downloaded from the k buckets 260 can be summed, thereby alleviating computational costs associated with performing encrypted operations. In the example shown, the additive homomorphic encryption computation 268 includes a dot product computation. Thereafter, the service 160 returns the ciphertext value for the corresponding c sum O of data blocks (e.g., sum $O_l$ in the example of FIG. 2D) to the client device 120 and the client device 120 decrypts the ciphertext value to compute the c sum O of data blocks (e.g., sum $O_l$ in the example of FIG. 2D) for storage on the local memory hardware 122 to initialize the state 250. This process repeats for each c sum O of data blocks to be computed.

Figure 3A:
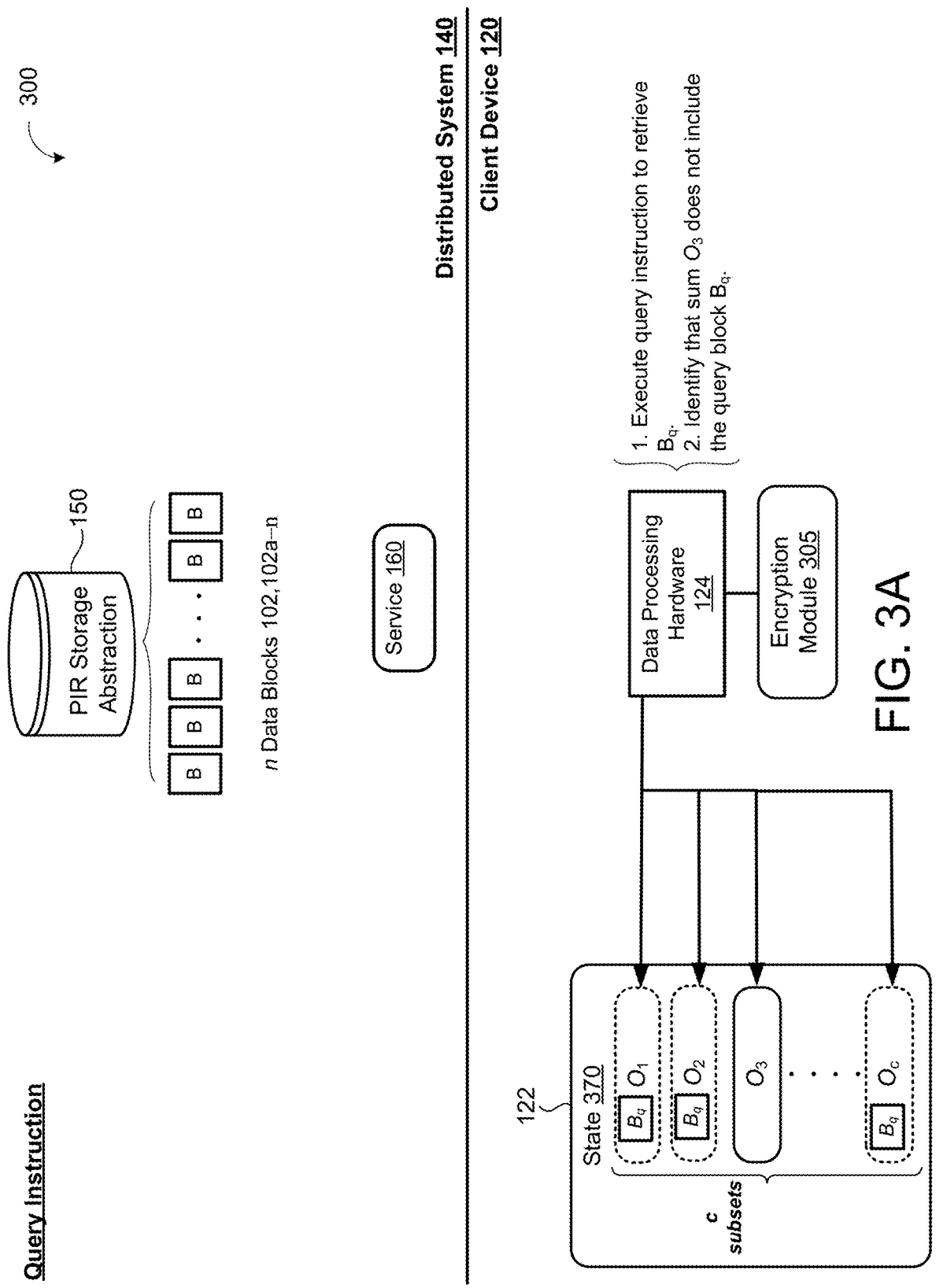
FIGS. 3A-3C are schematic view of an example query instruction executing on a client device to obviously retrieve a data block stored on an untrusted storage device of a distributed system.
Figure 3B:
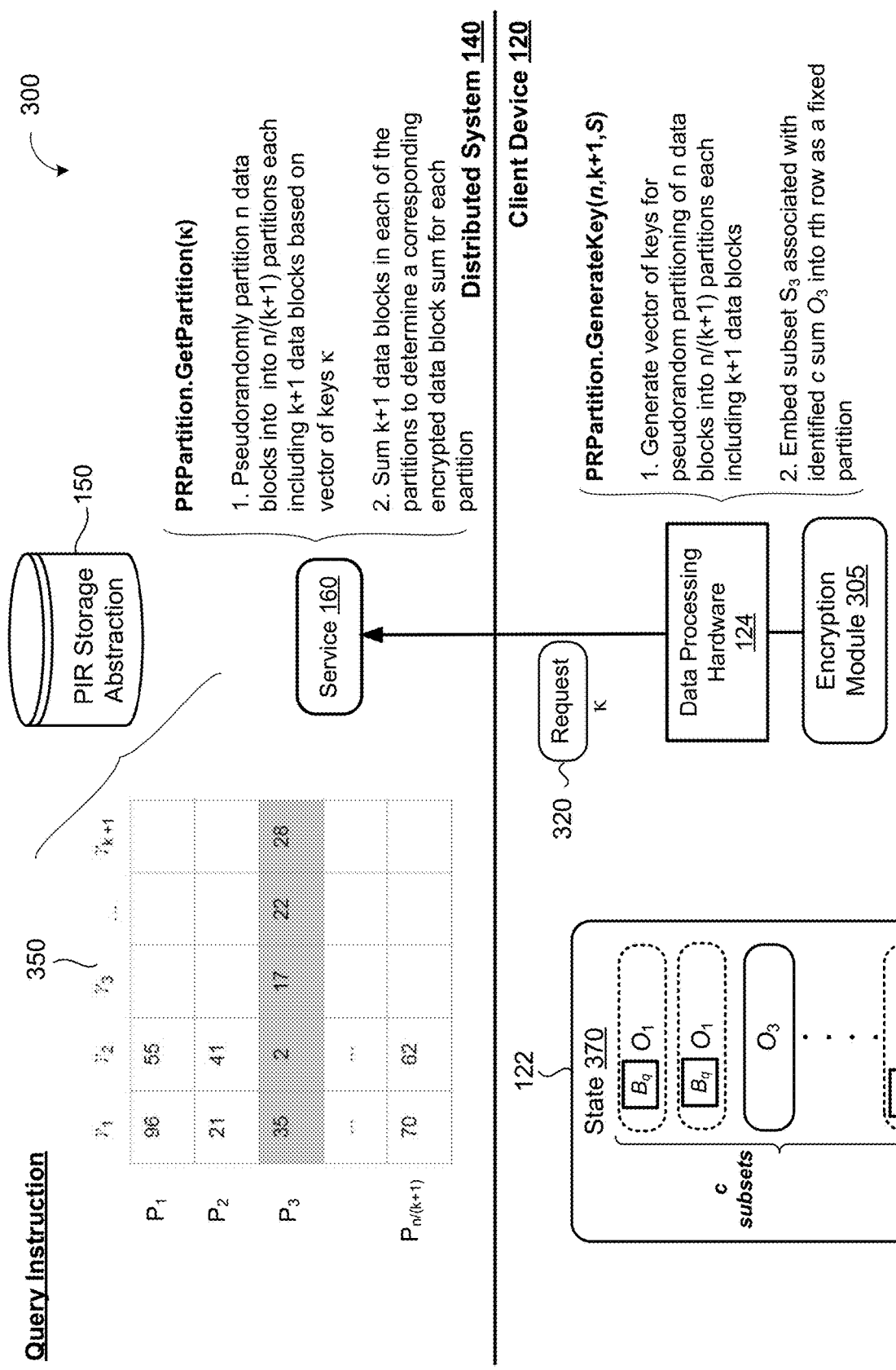
Figure 3C:
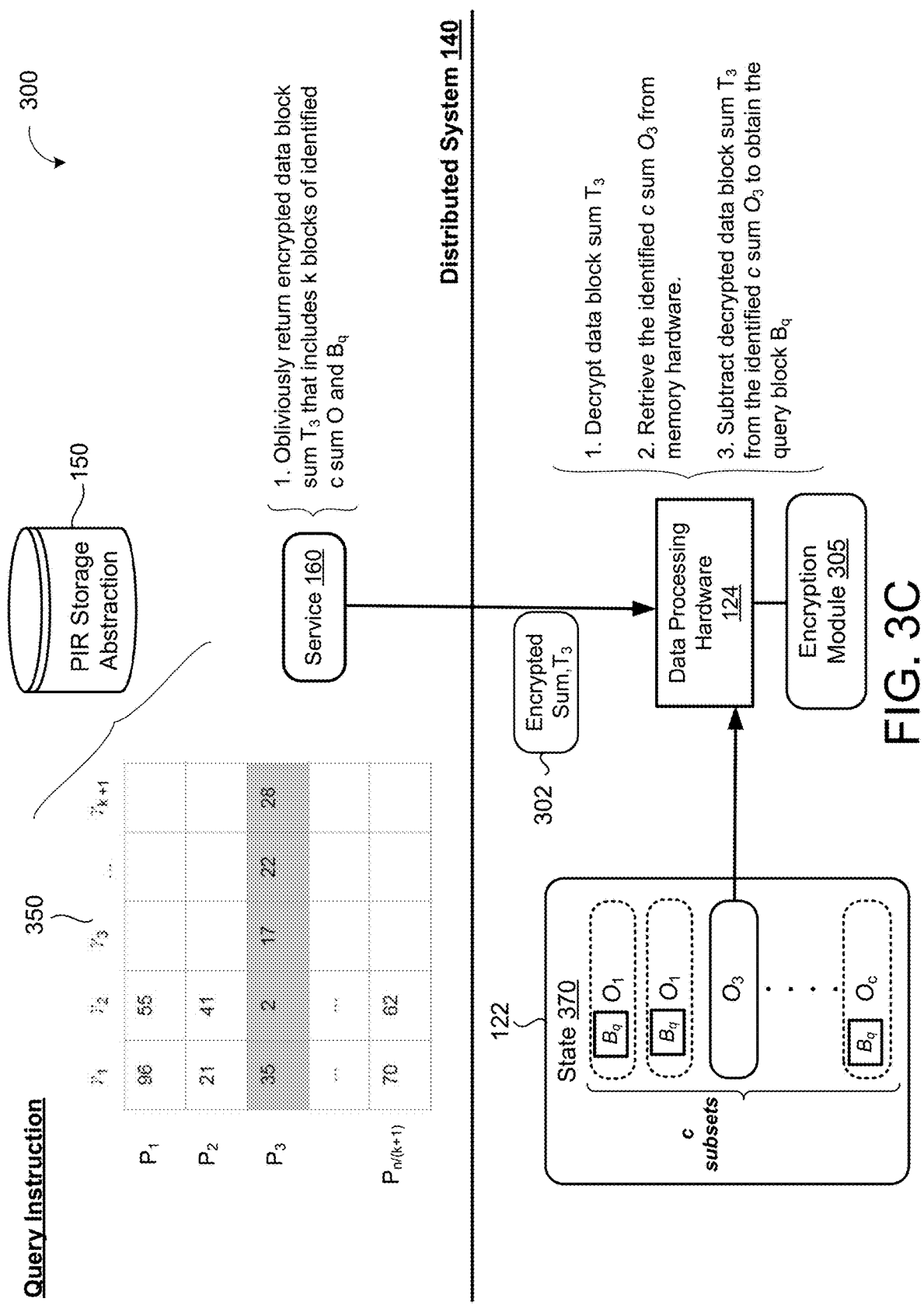

FIGS. 3A-3C provide an example query instruction 300 executing on the client device 120 for retrieving the query block $B_q$ from the storage abstraction 150 after initializing the state 250 via execution of the private BSR instruction 200 of FIGS. 2A-2E). FIG. 3A shows the client device 120 iterating through each of the c sums O of data blocks 1-2 stored on the memory hardware 122 to identify one of the c sums O that does not include the query block $B_q$. In the example shown, the client device 120 ceases iterating through the c sums O upon identifying that the third sum $O_3$ does not include the query block $B_q$. Sums $O_1$, $O_2$, and $O_c$ all include the query block $B_q$. The storage abstraction 150 includes the database of n data blocks 102, 102a-n. The database of the storage abstraction 150 in the present disclosure may include an online partial sums data structure with integers ordered 1 to n to allow efficient construction of partial sums, update items, and select values efficiently.

FIG. 3B shows the client device 120 generating a vector of keys κ(PRPartition.GenerateKey(n,k+1,S)) after identifying the c sum O (e.g., sum O3) that does not include the query block $B_q$. FIG. 4A provides an example algorithm 400a for generating the vector of keys κ (PRPartition.GenerateKey(n,k+1,S)). The vector of keys κ generated by the client device 120 during execution of the query instruction 200 includes instructions for pseudorandomly partitioning the untrusted storage device of n data blocks into $$\frac{n}{k+1}$$

partitions 350 each containing k+1 data blocks 102. More specifically, the $$\frac{n}{k+1}$$

partitions 350 include a two-dimensional matrix of constrained pseudorandom partitions such that one of the partitions is a fixed partition that includes the identified c sum O (e.g., sum $O_3$) of data blocks that does not include the query block $B_q$. Thus, the vector of keys κ embeds, in a manner oblivious from the storage abstraction 150 and the service 160 managing the storage abstraction 150, the subset S (e.g., subset $S_3$) corresponding to the identified c sum O (e.g., sum $O_3$) of data blocks that does not include the query block $B_q$ into a random $r^{th}$ row of the partitions 350 as a fixed partition. Advantageously, the client device 120 may generate the vector of keys κ for partitioning the storage abstraction 150 locally without requiring any computations at the distributed system 140.

The client device 120 instructs the service 160 to execute the constrained pseudorandom partitioning to sample random subsets of data of a given size with space-efficient representations. Namely, the vector of keys κ uses a pseudorandom family of permutations over the storage abstraction 150 (e.g., database) of [n] integers (e.g., data blocks 102) by generating a random key/seed K and using a set {F(κ, 1), . . . , F(κ, k)}. As a result, the request 320 causes service 160 to partition the [n] integers into $$\frac{n}{k+1}$$

sets of size k+1 integers as a two-dimensional matrix in which each row will represent a corresponding partition. The two-dimensional matrix is initially empty and a pseudorandom permutation to select a row to embed an input subset S in a randomly chosen order. The remaining elements of [n] integers should be randomly distributed to empty matrix. One of the $$\frac{n}{k+1}$$

partitions is fixed to an input subset S of exactly k data blocks 102. This fixed input subset S corresponds to one of the computed c sums O of data blocks 102 stored locally on the memory hardware 122 of the client device 120. Specifically, the execution of the CPP instruction 300 guarantees that the fixed input subset S corresponds to one of the c sums O previously computed by the BSR instruction 200 by picking a pivot such that one of the $$\frac{n}{k+1}$$

partitions of the generated permutation at pivot, . . . , $$\text{pivot} + \binom{n}{k} - 1$$

is the desired fixed input subset S. Thus, the fixed input subset S will correspond to the evaluations of the permutation at the $$\frac{n}{k+1}$$

indices.

In some examples, to find the pivot associated with a fixed element s, the pivot may be set to be $\pi-1$ (s)–r where r is uniformly chosen at random from $$\{0, \ldots, \binom{n}{k} - 1\}$$

guaranteeing that s will appear in the generated subset. The sampling only succeeds when the random subset of size $$\binom{n}{k} - 1$$

generated around the fixed element does not contain any other elements from the input subset. The probability that the random subset does not contain an input subset element can be described as follows:

$$\left(1 - \frac{k-1}{n-1}\right)\left(1 - \frac{k-1}{n-2}\right) \cdots \left(1 - \frac{k-1}{n - \binom{n}{k}}\right) \geq \qquad (1)$$

$$\left(1 - \frac{k-1}{n\left(1 - \left(\frac{1}{k}\right)\right)}\right)^{O\left(\frac{n}{k}\right)} = \frac{1}{e^{O(1)}}$$

Based on this approach, a permutation key may represent the subsets in each column of the matrix such that all column subsets contain exactly one element from the fixed input subset S embedded into one of the rows of the matrix. Additionally, all column subsets must be pairwise disjoint. In some examples, the instruction 300 generates a random key for a pseudorandom permutation over all possible remaining items. An evaluation of a pseudorandom permutation $l_i:=F(K,i)$ maps to the $l_i$-th largest remaining element. The subset of size k specified from a permutation $\pi$ is simply the set containing the $i_1$-th, . . . , $i_k$-th largest remaining elements, thereby ensuring all future sampled subsets are disjoint with any pervious fixed column subsets. With the ability to ensure disjoint sampled subsets, each column subset can be generated using a constant number of samples.

While explicitly storing all unused elements requires linear storage, the instruction 300 only requires knowledge of the remaining unused items from the input subset. In particular, knowledge is required for the number of unused items which are smaller in value for each remaining input subset element, dented as the rank. The items of the input subset are stored in sorted order such that the particular sum up to an index i will be equal to the rank of i-th largest member of the input subset. When initializing the data structure, differences are stored between adjacent elements of the sorted input subset to ensure that rank can be retrieved by performing a partial sum query. Removing an element from the set of unused elements requires decreasing the rank of all input subset elements that are larger than the removed element by one. This can be achieved by simply subtracting one from the index of the smallest item in the input subset that is larger than the element to be removed. As a result, the rank of all input subset elements larger will also decrease by one. Finding the smallest element from the input subset larger than the removed element requires a single PartialSums.Select operation while retrieving the rank and updating an entry requires a single PartialSums.Sum and PartialSums.Update operation respectively. The entire data structure only requires storing a single entry for each input subset item meaning storage requirements are linear in the input subset size.

With continued reference to FIG. 3B, the client device 120 sends a request 320 to the service 160 that includes the vector of pseudorandom permutation partitioning keys κ. The request 320, when received by the service 160, causes the service 160 to pseudorandomly partition (PRPartition.GetPartition(κ)) the storage abstraction 150 of n data blocks 102 into the $$\frac{n}{k+1}$$

partitions 350 with one of the $$\frac{n}{k+1}$$

partitions 350 including the fixed partition that includes the identified c sum O (e.g., sum $O_3$) of data blocks 102 that does not include the query block $B_q$. FIG. 4B provides an example algorithm 400b for using the vector of pseudorandom permutation partitioning keys κ to pseudorandomly partition the storage abstraction 150 into the $$\frac{n}{k+1}$$

partitions 350. In the example shown, the third partition $P_3$ of the $$\frac{n}{k+1}$$

partitions 350 includes the fixed partition that includes the query block $B_q$ and the identified c sum O (e.g., sum $O_3$) of data blocks 102 that does not include the query block $B_q$. Here, the third partition $P_3$ includes the k blocks of the identified c sum O of data blocks 102 and one additional block that includes the query block $B_q$. The third partition $P_3$ corresponds to the $3^{rd}$ row of the two-dimensional matrix representing the $$\frac{n}{k+1}$$

partitions 350. The pseudorandomly partitioning of the PIR storage abstraction 150 (e.g., database) by the service 160 further includes the service 160 summing the k+1 data blocks in each of the partitions 350 to determine a corresponding encrypted data block sum $T_1, T_2, \ldots, T_{(n/k+1)}$ 302 for each partition $P_1, P_2, \ldots, P_{(n/k+1)}$.

FIG. 3C shows the service 160 obliviously returning the encrypted data block sum $T_3$ 302 for the third partition $P_3$ that includes the k blocks of the identified c sum O of data blocks 102 and the one additional block that includes the query block $B_q$. In response to receiving the encrypted data block sum $T_3$ 302, the client device 120 decrypts the encrypted data block sum $T_3$ 302, retrieves the identified c sum O (e.g., sum $O_3$) of data blocks 102 that does not include the query block $B_q$, and subtracts the decrypted data block sum $T_3$ 302 from the identified c sum $O_3$ of k data blocks 102 to obtain the query block $B_q$.

FIG. 4C provides an example algorithm 400c for initializing the client state 250 by executing one of the private BSR instructions 200, 200a, 200b, 200c set forth in the remarks above. FIG. 4D provides an example algorithm 400d for executing the query (q) to retrieve a query block $B_q$. The example algorithm 400d includes the PRPartition.GenerateKey(n,k+1,S) step for generating the vector of pseudorandom partitioning keys κ locally at the client device 120 and the subsequent PRPartition.GetPartition(κ) step for pseudorandomly partitioning the PIR storage using the vector of pseudorandom partitioning keys κ.

In other implementations, the constrained pseudorandom partitions are replaced with obliviously constrained partitions that make use of pseudorandom functions. A subroutine may generate the obliviously constrained partitions by extracting an ordered subject of size m blocks from the storage abstraction 150 of n data blocks 102 given any seed/key κ to evaluate a pseudorandom function (PRF) for consecutive inputs until m distinct values are encountered. Given a set Tκ generated by seed/key κ, the routine may fix the r-th element of Tκ to be any value, such that the r-th value of a re-oriented subset is i and the remaining m−1 elements are random. As such a random constrained subset can be generated by sampling a random κ, generating Tκ, and fixing the r-th element into the two-dimensional matrix representing the $$\frac{n}{k+1}$$

partitions 350. Here, sampling only requires knowledge of remaining unused items from the constraint subset because only a check is required to determine whether a randomly generated constrained subset interacts with the constrained subset beyond the fixed element. Put another way, sampling only requires knowledge of the number of unused numbers which are smaller in value than each remaining constraint subset element. This knowledge corresponds to a crank of each constrained subset element. As such, only the constraint subset and corresponding rank amongst all unused items requires explicitly storage. Therefore, once a column subset is fixed, the rank of all input subset elements must be updated to reflect all fixed items that are no longer used. That is, the rank of all constraint subset elements must be decreased by all items in the column subset that are smaller. As a consequence, the sub-routine for generating oblivious constrained partitions only requires O(k) storage to maintain the ranks.

The routine for generating the obliviously constrained partitions may include agenerate key step (OCP.GenerateKey) for generating keys and an extract partition step (OCP.ExtractPartition) for extracting the fixed partition. FIG. 4E provides an example algorithm 400e of the OCP.GenerateKey step for generating the keys and FIG. 4F provides an example algorithm 400f for extracting the fixed partition In some implementations, the example algorithm 400d for executing the query instruction 300 to retrieve the data block $B_q$ may instead replace the pseudorandom partitions with obliviously constrained partitions that make use of the pseudorandom functions without departing from the scope of the present disclosure. Here, the algorithm 400d may replace the PRPartition.GenerateKey(n,k+1,S) step (FIG. 4A) with the OCP.GenerateKey step (FIG. 4E) for generating keys and replace the subsequent PRPartition.GetPartition(K) step (FIG. 4B) with the extract partition step OCP.ExtractPartition (FIG. 4F) for obliviously partitioning the PIR storage and extracting the fixed partition based on the PRF keys.

Figure 5:
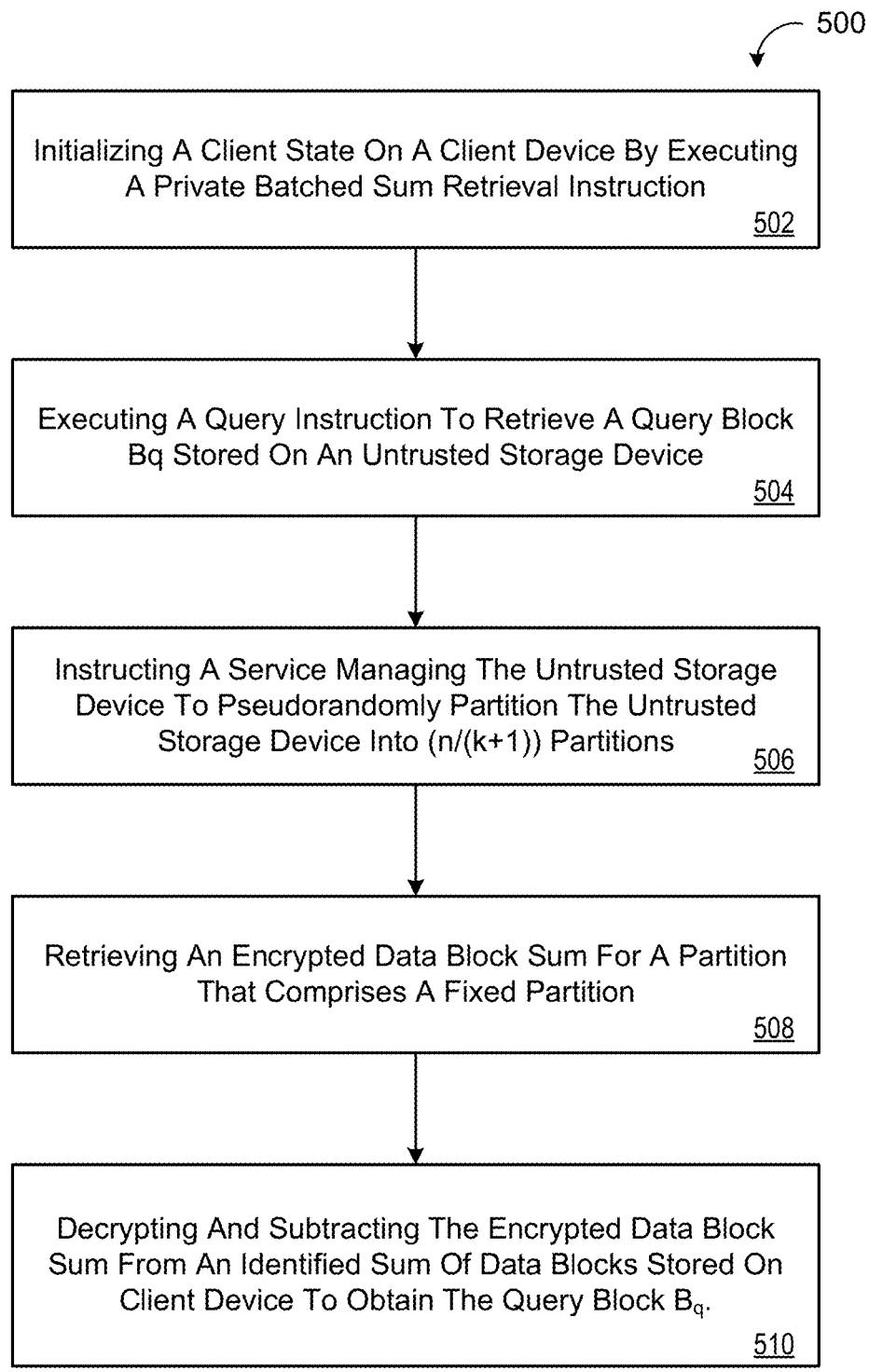
FIG. 5 is a flowchart of an example arrangement of operations for a method of obliviously retrieving a data block from an untrusted storage device using private information retrieval.

FIG. 5 is a flow chart of an example arrangement of operations for a method 500 using private information retrieval (PIR) to retrieve publically-known data blocks 102 stored as plaintext on an untrusted storage device 114, 150. The untrusted storage device may include one or more storage devices 114 implementing the storage abstraction 150 on the distributed system 140. The untrusted storage device 114, 150 may be any data store or database that stores publically-known and un-encrypted data blocks available for multiple client devices to access. The PIR aspect guarantees that the untrusted storage device 150, or service 160 managing the storage device 150, does not learn the access patterns or data retrieved from the storage device 150. The data processing hardware 124 of each client device 120 may execute the operations for the method 500 by executing instructions stored on the memory hardware 122. At operation 502, the method 502 includes initializing a client state 250 on the client device 120 by executing a private batched sum retrieval instruction 200 to compute c sums O of data blocks 102 from an untrusted storage device 150, each computed sum O stored on memory hardware 122 of the client device 120 and including a sum of a corresponding subset S of exactly k data blocks 102

At operation 504, the method 500 includes executing a query instruction 300 to retrieve a query block $B_q$ stored on the untrusted storage device 150 by iterating through each of the c sums O of data blocks 102 stored on the memory hardware 124 to identify one of the c sums O that does not include the query block $B_q$. At operation 506, execution of the query instruction 300 further includes instructing a service 160 managing the untrusted storage device 150 to pseudorandomly partition the untrusted storage device 150 of n data blocks into $$\frac{n}{k+1}$$

partitions 350 each containing k+1 data blocks 102 and summing the k+1 data blocks 102 in each of the $$\frac{n}{k+1}$$

partitions 350 to determine a corresponding encrypted data block sum 302 for each of the $$\frac{n}{k+1}$$

partitions 350, one of the $$\frac{n}{k+1}$$

partitions 350 including a fixed partition that includes the identified c sum O of data blocks that does not include the query block $B_q$. Operation 506 may generate the partitions 350 based on the constrained pseudorandom partitions via algorithms 400a, 400b of FIGS. 4A and 4B or based on the obliviously constrained partitions via algorithms 400e, 400f of FIGS. 4E and 4F.

At operation 508, execution of the query instruction 300 further includes retrieving the encrypted data block sum 302 for the $$\frac{n}{k+1}$$

partition that includes the fixed partition from the service managing the untrusted storage device 150. At operation 510, execution of the query instruction 300 further includes decrypting and subtracting the encrypted data block sum 302 from the identified c sum O of data blocks stored on the memory hardware 122 of the client device 120 to obtain the query block $B_q$. The method may include determining whether the number of queries (q) exceeds a query threshold, and re-initializing the client state 250 when the number of queries (q) exceeds the query threshold.

Figure 6:
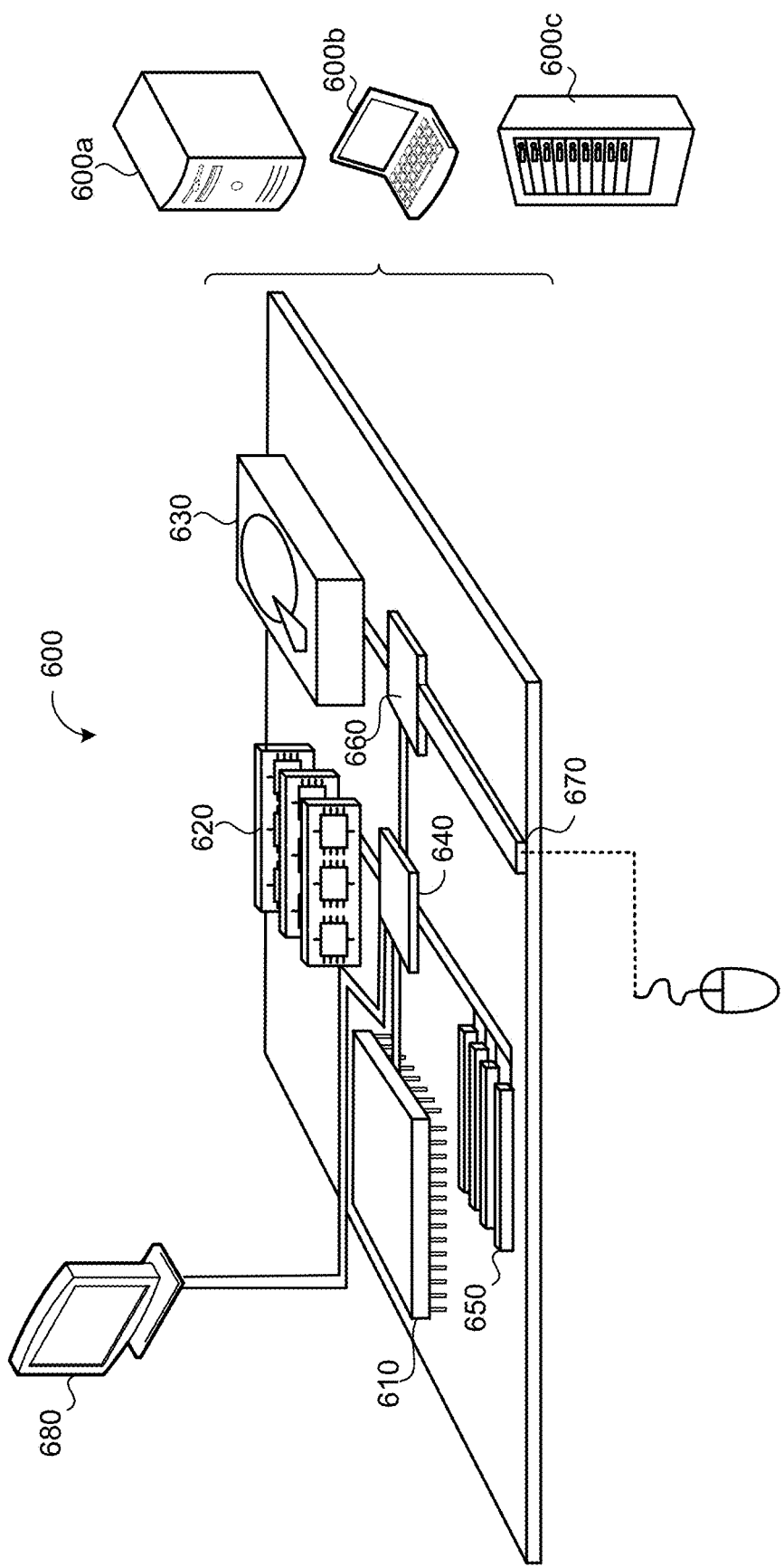
FIG. 6 is a schematic view of an example computing device that may be used to implement the systems and methods described herein.

FIG. 6 is schematic view of an example computing device 600 (e.g., data processing hardware) that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 (e.g. memory hardware) is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware of a client device that causes the data processing hardware to perform operations comprising:
   initializing a client state on the client device based on a plurality of sums of data blocks from an untrusted storage device, each of the plurality of sums stored on memory hardware of the client device;
   obtaining a query request requesting retrieval of a query block stored on the untrusted storage device;
   determining a first sum of the plurality of sums that does not include the query block;
   requesting, from a manager of the untrusted storage device, determination of an encrypted data block sum based on the first sum and a sum of a portion of the data blocks from the untrusted storage device, the sum of the portion of the data blocks comprising the requested query block;
   based on requesting the determination of the encrypted data block sum, receiving, from the manager of the untrusted storage device, the encrypted data block sum;
   decrypting the encrypted data block sum; and
   determining the requested query block based on the decrypted data block sum and the plurality of sums of data blocks.

2. The method of claim 1, wherein determining the first sum of the plurality of sums that does not include the query block comprises iterating through each of the plurality of sums of data blocks stored on the memory hardware.

3. The method of claim 1, wherein determining the first sum of the plurality of sums that does not include the query block comprises downloading a plurality of data blocks from the untrusted storage device.

4. The method of claim 3, wherein a quantity of the downloaded plurality of data blocks is equal to a product between a quantity of a subset of data blocks and a quantity of the plurality of sums.

5. The method of claim 1, wherein requesting, from the manager of the untrusted storage device, the encrypted data block sum based on the first sum causes the manager to pseudorandomly partition the untrusted storage device into a plurality of partitions, each respective partition of the plurality of partitions comprising a respective plurality of data blocks.

6. The method of claim 5, wherein the manager, for each respective partition of the plurality of partitions, sums the respective plurality of data blocks to determine the encrypted data block sum.

7. The method of claim 1, wherein determining the requested query block based on the decrypted data block sum and the plurality of sums of data blocks comprises subtracting the decrypted data block sum from the first sum.

8. The method of claim 1, wherein the operations further comprise:
- determining that a number of queries exceeds a query threshold; and
- in response to determining that the number of queries exceeds the query threshold, re-initializing the client state.

9. The method of claim 1, wherein determining the first sum of the plurality of sums that does not include the query block comprises generating a vector of additively homomorphic encryptions.

10. The method of claim 9, wherein determining the first sum of the plurality of sums that does not include the query block further comprises uploading the vector of additively homomorphic encryptions to the untrusted storage device.

11. A system comprising:
- data processing hardware of a client device; and
- memory hardware in communication with the data processing hardware, the memory hardware storing instructions that when executed on the data processing hardware cause the data processing hardware to perform operations comprising:
  - initializing a client state on the client device based on a plurality of sums of data blocks from an untrusted storage device, each of the plurality of sums stored on memory hardware of the client device;
  - obtaining a query request requesting retrieval of a query block stored on the untrusted storage device;
  - determining a first sum of the plurality of sums that does not include the query block;
  - requesting, from a manager of the untrusted storage device, determination of an encrypted data block sum based on the first sum and a sum of a portion of the data blocks from the untrusted storage device, the sum of the portion of the data blocks comprising the requested query block;
  - based on requesting the determination of the encrypted data block sum, receiving, from the manager of the untrusted storage device, the encrypted data block sum;
  - decrypting the encrypted data block sum; and
  - determining the requested query block based on the decrypted data block sum and the plurality of sums of data blocks.

12. The system of claim 11, wherein determining the first sum of the plurality of sums that does not include the query block comprises iterating through each of the plurality of sums of data blocks stored on the memory hardware.

13. The system of claim 11, wherein determining the first sum of the plurality of sums that does not include the query block comprises downloading a plurality of data blocks from the untrusted storage device.

14. The system of claim 13, wherein a quantity of the downloaded plurality of data blocks is equal to a product between a quantity of a subset of data blocks and a quantity of the plurality of sums.

15. The system of claim 11, wherein requesting, from the manager of the untrusted storage device, the encrypted data block sum based on the first sum causes the manager to pseudorandomly partition the untrusted storage device into a plurality of partitions, each respective partition of the plurality of partitions comprising a respective plurality of data blocks.

16. The system of claim 15, wherein the manager, for each respective partition of the plurality of partitions, sums the respective plurality of data blocks to determine the encrypted data block sum.

17. The system of claim 11, wherein determining the requested query block based on the decrypted data block sum and the plurality of sums of data blocks comprises subtracting the decrypted data block sum from the first sum.

18. The system of claim 11, wherein the operations further comprise:
- determining that a number of queries exceeds a query threshold; and
- in response to determining that the number of queries exceeds the query threshold, re-initializing the client state.

19. The system of claim 11, wherein determining the first sum of the plurality of sums that does not include the query block comprises generating a vector of additively homomorphic encryptions.

20. The system of claim 19, wherein determining the first sum of the plurality of sums that does not include the query block further comprises uploading the vector of additively homomorphic encryptions to the untrusted storage device.

* * * * *